(12) United States Patent
Kim et al.

(10) Patent No.: US 9,190,003 B2
(45) Date of Patent: Nov. 17, 2015

(54) DISPLAY APPARATUS AND METHOD OF MANUFACTURING THE SAME

(75) Inventors: Sungman Kim, Seoul (KR); ManHong Na, Seoul (KR); Min-Chul Song, Seoul (KR); Junho Song, Seongnam-si (KR); Eugene Lee, Busan (KR); Sung-Hoon Lim, Gunsan-si (KR); YoungJe Cho, Asan-si (KR); Soojung Chae, Seoul (KR)

(73) Assignee: Samsung Display Co., Ltd. (KR)

( * ) Notice: Subject to any disclaimer, the term of this patent is extended or adjusted under 35 U.S.C. 154(b) by 573 days.

(21) Appl. No.: 13/618,889

(22) Filed: Sep. 14, 2012

(65) Prior Publication Data

US 2013/0113766 A1    May 9, 2013

(30) Foreign Application Priority Data

Nov. 4, 2011   (KR) .................. 10-2011-0114692

(51) Int. Cl.
   *G09G 3/36*      (2006.01)
   *G02F 1/1362*    (2006.01)

(52) U.S. Cl.
   CPC ........ *G09G 3/3648* (2013.01); *G02F 1/136227* (2013.01); *G02F 1/136286* (2013.01); *G09G 3/3674* (2013.01); *G09G 2300/0426* (2013.01); *G09G 2310/0286* (2013.01); *G09G 2320/0219* (2013.01); *G09G 2320/0233* (2013.01)

(58) Field of Classification Search
   CPC .............. G09G 3/3648; G09G 3/3674; G09G 2300/0426; G09G 2310/0286; G09G 2320/0219; G09G 2320/0233; G02F 1/136227; G02F 1/136286
   USPC ................................................. 345/205, 206
   See application file for complete search history.

(56) References Cited

U.S. PATENT DOCUMENTS

| 2003/0030381 | A1* | 2/2003 | Yamazaki et al. ......... 315/169.1 |
| 2007/0008268 | A1* | 1/2007 | Park et al. ....................... 345/92 |
| 2010/0109996 | A1  | 5/2010 | Park et al. |

FOREIGN PATENT DOCUMENTS

| KR | 10-2004-0055188 | 6/2004 |
| KR | 10-0488933      | 5/2005 |

* cited by examiner

*Primary Examiner* — Premal Patel
(74) *Attorney, Agent, or Firm* — Innovation Counsel LLP

(57) ABSTRACT

A display apparatus includes a plurality of first gate lines extended in a first direction and disposed on a substrate on which a plurality of pixels is disposed, a plurality of second gate line extended in a second direction to cross the first gate lines, a plurality of data lines disposed substantially parallel to the first gate lines, and a first insulating layer disposed between the first gate lines and the second gate lines and provided with a plurality of via holes to expose a portion of a corresponding first gate line of the first gate lines. Each of the first gate lines makes contact with a corresponding second gate line of the second gate lines through a corresponding via hole of the via holes.

23 Claims, 22 Drawing Sheets

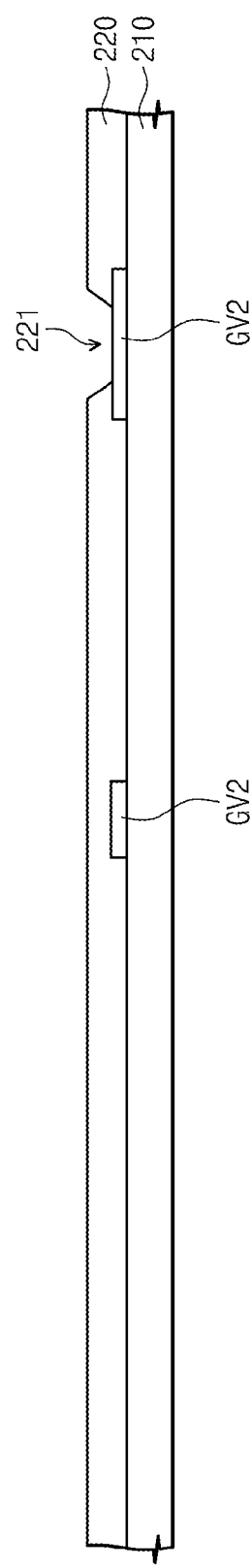

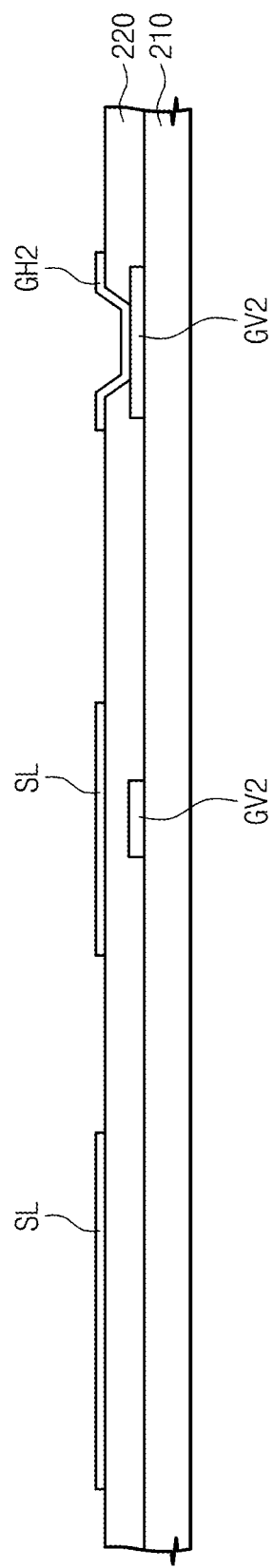

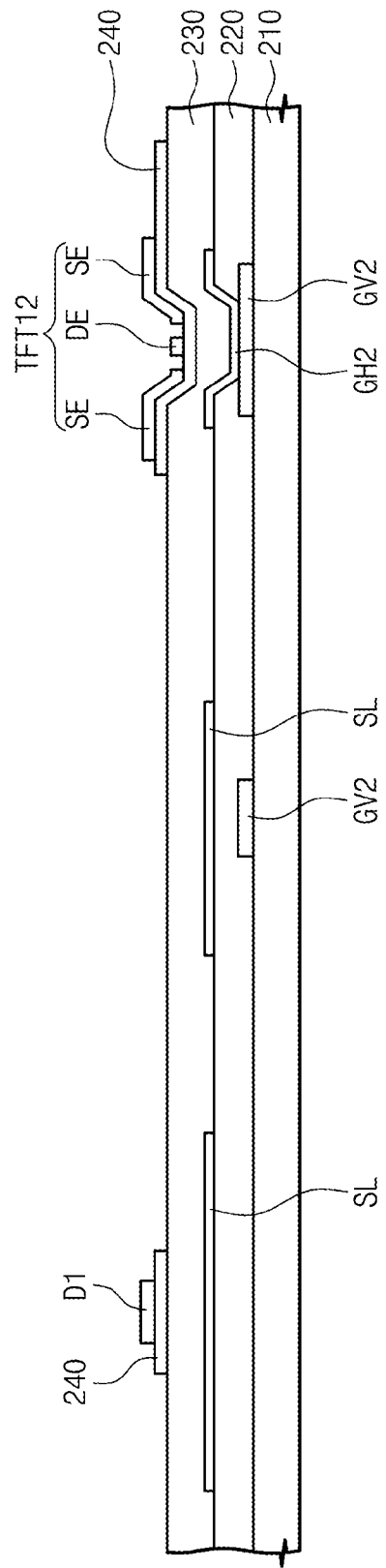

DISPLAY APPARATUS AND METHOD OF MANUFACTURING THE SAME

CROSS-REFERENCE TO RELATED APPLICATION

This application relies claims priority under 35 U.S.C §119 to Korean Patent Application No. 10-2011-0114692, filed on Nov. 4, 2011, the disclosure of which is incorporated by reference herein.

BACKGROUND

1. Technical Field

The present invention relates to a display apparatus and a method of manufacturing the same. More particularly, the present invention relates to a display apparatus that has a reduced size while maintaining a high display quality, and a method of manufacturing the display apparatus.

2. Description of the Related Art

In general, a display apparatus includes a display panel and a driving circuit driving the display panel to display an image corresponding to an external input signal. The driving circuit includes a gate driving circuit and a data driving circuit. The gate driving circuit includes a gate driving IC (integrated circuit). Recently, the gate driving IC has been made with an amorphous silicon gate (ASG) circuit using an amorphous silicon thin film transistor (a-Si TFT).

In general, the ASG circuit is positioned at a left or right side of the display panel or at both left and right sides of the display panel. Accordingly, it is difficult to reduce non-display areas disposed at the left and right sides of the display panel due to the ASG circuit.

SUMMARY

A display apparatus capable of reducing its size without deteriorating of a display quality is provided.

A method of manufacturing the display apparatus is also provided.

A display apparatus includes a plurality of first gate lines extended in a first direction and disposed on a substrate on which a plurality of pixels is disposed, a plurality of second gate line extended in a second direction to cross the first gate lines, a plurality of data lines disposed substantially parallel to the first gate lines, and a first insulating layer disposed between the first gate lines and the second gate lines and provided with a plurality of via holes each positioned to expose a portion of a corresponding first gate line of the first gate lines. Each of the first gate lines makes contact with a corresponding second gate line of the second gate lines through a corresponding via hole of the via holes.

The display apparatus further includes a second insulating layer that covers the second gate lines, an active pattern disposed to face a contact region in which the first gate lines are connected to the second gate lines, source electrodes respectively branched from the data lines over the active pattern, and drain electrodes respectively each positioned corresponding to and being spaced apart from the source electrodes.

The first gate lines are disposed on the substrate, and the first insulating layer is disposed on the substrate to cover the first gate lines and provided with the via holes each of which exposes the portion of the corresponding first gate line of the first gate lines.

The first gate lines are alternately arranged with the data lines and either one of the first gate lines or one of the data lines is disposed between two pixels adjacent to each other in the second direction among the pixels.

The display apparatus further includes a source driver connected to a first end of each of the data lines and a gate driver disposed adjacent to a second end of each of the data lines and connected to a first end of each of the first gate lines.

Each of the number of the first gate lines and the number of the second gate lines is n (where "n" is "2×a" and "a" is a positive constant), and the first gate lines are connected to the second gate lines in a one-to-one correspondence through the via holes.

The display apparatus further includes a first discharge circuit disposed at a first side of the substrate and connected to the second gate lines to discharge an i-th second gate line when a predetermined time lapses after the i-th second gate line is driven (where the "i" is a natural number satisfying 1≤i≤n), and a second discharge circuit disposed at a second side of the substrate to face the first discharge circuit and connected to the second gate lines to discharge the i-th second gate line when the predetermined time lapses after the i-th second gate line is driven.

The first discharge circuit includes a plurality of first discharge transistors each respectively corresponding to the second gate lines, and an i-th first discharge transistor is connected between the i-th second gate line and a ground voltage and includes a gate terminal controlled by a signal from an (i+2)th second gate line.

The second discharge circuit includes a plurality of second discharge transistors each respectively corresponding to the second gate lines, and an i-th second discharge transistor is connected between the i-th second gate line and the ground voltage and includes a gate terminal controlled by the signal from the (i+2)th second gate line.

The gate driver includes a plurality of gate stages each respectively corresponding to one of the first gate lines to drive a corresponding first gate line of the first gate lines in response to a corresponding one of first, second, third, and fourth clock signals, a first dummy stage operated in response to the first clock signal, and a second dummy stage operated in response to the second clock signal. The gate stages each of which corresponds to a first first-gate line and a second first-gate line among the gate stages and the second dummy stage receive a vertical synchronization signal, even-numbered stages among the gate stages and first and second dummy stages are connected to each other in a cascade structure, and odd-numbered stages among the gate stages and first and second dummy stages are connected to each other in a cascade structure.

The display apparatus further includes first signal lines that transmit the first and third clock signals and the vertical synchronization start signal and second signal lines that transmit the second and fourth clock signals. The first signal lines are connected to the gate stages and the first and second dummy stages through a first area adjacent to a display area on which the pixels are disposed and the second signal lines are connected to the gate stages and the first and second dummy stages through a second area adjacent to the display area and opposite to the first area.

First to n-th first gate lines of the first gate lines are sequentially connected to first to n-th second gate lines of the second gate lines, the first second gate line is disposed most adjacent to the source driver, and the first to n-th second gate lines are sequentially arranged.

The display apparatus further includes first signal lines that transmit the first and third clock signals and the vertical synchronization start signal and second signal lines that transmit the second and fourth clock signals and the vertical synchronization start signal. The first signal lines are connected to the gate stages and the first and second dummy stages through a first area of the substrate and the second signal lines are connected to the gate stages and the first and second dummy stages through a second area of the substrate and opposite to the first area.

First to n-th first gate lines of the first gate lines are sequentially connected to first to n-th second gate lines of the second gate lines, the first second gate line is disposed most adjacent to the source driver, and the first to n-th second gate lines are sequentially arranged.

The gate stages respectively connected to the first and second first-gate lines of the first gate lines receive the vertical synchronization start signal through the first signal lines, and the second dummy stage receives the vertical synchronization start signal through the second signal lines.

First to n-th first gate lines of the first gate lines are sequentially connected to the n-th to first second gate lines of the second gate lines, the n-th second gate line is disposed most adjacent to the gate driver, and the n-th to first second gate lines are sequentially arranged.

The first to (n/2)th first gate lines of the first gate lines are sequentially connected to odd-numbered second gate lines of the second gate lines, the first first-gate line is connected to (n−1)th second gate line, and ((n/2)+1)th to n-th first gate lines of the first gate lines are sequentially connected to even-numbered second gate lines of the second gate lines. The ((n/2)+1)th first gate line is connected to the second second-gate line, and the second second-gate line is disposed most adjacent to the source driver.

The gate stages respectively connected to the (n/2)th first gate line and ((n/2)−1)th first gate line of the first gate lines and the first dummy stage receive the vertical synchronization start signal through the first signal lines, and the gate stages respectively connected to the ((n/2)+1)th first gate line and ((n/2)+2)th first gate line of the first gate lines and the second dummy stage receive the vertical synchronization start signal through the second signal lines.

The first to (n/2)th first gate lines of the first gate lines are sequentially connected to odd-numbered second gate lines of the second gate lines, the first first-gate line is connected to first second-gate line that is most adjacent to the source driver, ((n/2)+1)th to n-th first gate lines of the first gate lines are sequentially connected to even-numbered second gate lines of the second gate lines, and the ((n/2)+1)th first gate line is connected to the n-th second gate line that is disposed most adjacent to the gate driver.

The gate stages respectively connected to the first first-gate line and the second first-gate line of the first gate lines and the first dummy stage receive the vertical synchronization start signal through the first signal lines, and the gate stages respectively connected to the n-th first gate line and (n−1)th first gate line of the first gate lines and the second dummy stage receive the vertical synchronization start signal through the second signal lines.

The first to (n/2)th first gate lines of the first gate lines are sequentially connected to odd-numbered second gate lines of the second gate lines, the first first-gate line is connected to the first second-gate line that is most adjacent to the source driver, ((n/2)+1)th to n-th first gate lines of the first gate lines are sequentially connected to even-numbered second gate lines of the second gate lines, and the ((n/2)+1)th first gate line is connected to the second second-gate line that is disposed most adjacent to the source driver.

According to the exemplary embodiments, a method of manufacturing a display apparatus is provided as follows. A first gate line is formed on a substrate, and a first insulating layer is formed on the substrate to include a via hole through which a portion of the first gate line is exposed. Then, a second gate line is formed on the first insulating layer to make contact with the first gate line through the via hole, and a second insulating layer is formed to cover the second gate line. An active pattern is formed to face a contact area in which the first gate line makes contact with the second gate line, and a source electrode is formed and a drain electrode is spaced apart from the source electrode.

The first gate line is extended in a first direction on the substrate, and the second gate line is extended in a second direction on the substrate to cross the first gate line.

According to the exemplary embodiments, a display apparatus includes a plurality of first gate lines extended in a first direction, a plurality of second gate line extended in a second direction to cross the first direction and connected to the first gate lines, respectively, a plurality of data lines disposed substantially parallel to the first gate lines, a plurality of pixels respectively disposed in areas defined by the first gate lines, the second gate lines, and the data lines, a gate driver configured to sequentially drive the first gate lines and the second gate lines, and a discharge circuit connected to the second gate lines to sequentially discharge the second gate lines after the second gate lines are sequentially driven.

The discharge circuit includes a first discharge circuit and a second discharge circuit. The first discharge circuit is disposed at a first side of a display area in which the pixels are arranged and connected to the second gate lines to sequentially discharge the second gate lines after the second gate lines are sequentially driven. The second discharge circuit is disposed at a second side of a display area to face the first discharge circuit and connected to the second gate lines to sequentially discharge the second gate lines after the second gate lines are sequentially driven.

According to the above, the gate driver is disposed at a lower portion of the display panel, and thus the width of the left and right non-display areas of the display panel may be reduced. In addition, the signal lines used to the signals for the operation of the gate driver are arranged in the left and right non-display areas, thereby reducing the width of the left and right non-display areas of the display panel,

BRIEF DESCRIPTION OF THE DRAWINGS

The above and other advantages will become readily apparent by reference to the following detailed description when considered in conjunction with the accompanying drawings wherein:

FIGS. 8B, 9B, 10B and 11B are cross-sectional views showing a method of manufacturing a display apparatus shown in FIG. 1;

DETAILED DESCRIPTION OF EXEMPLARY EMBODIMENTS

Exemplary embodiments will be described more fully hereinafter with reference to the accompanying drawings. However, the present invention may be embodied in various different ways and should not be construed as limited to the exemplary embodiments described herein.

Figure 1:
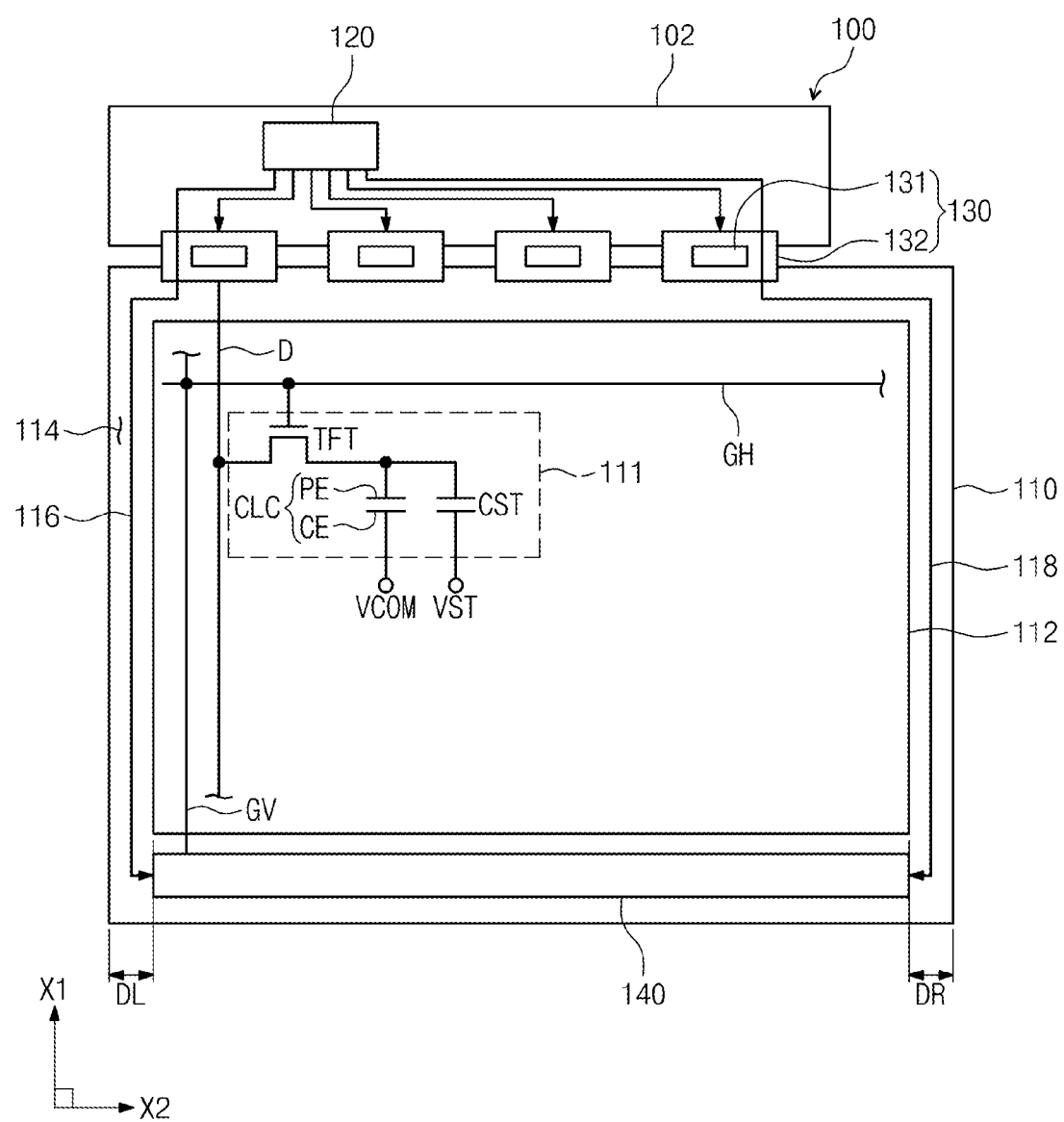
FIG. 1 is a plan view showing a display apparatus according to an exemplary embodiment.

FIG. 1 is a plan view showing a display apparatus according to an exemplary embodiment.

Referring to FIG. 1, a display apparatus 100 includes a printed circuit board 102, a display panel 110, a timing controller 120, a source driver 130, and a gate driver 140. The display panel 110 includes a display area 112 and a non-display area 114.

The display area 112 includes vertical gate lines GV (hereinafter, referred to as first gate lines) extended in a first direction X1, horizontal gate lines GH (hereinafter, referred to as second gate lines) extended in a second direction X2 to cross the first gate lines GV, data lines D substantially parallel to the first gate lines GV, and a plurality of pixels 111. Each of the pixels 111 includes a thin film transistor TFT, a liquid crystal capacitor CLC, and a storage capacitor CST. The thin film transistor TFT is electrically connected to a corresponding second gate line of the second gate lines GH and a corresponding data line of the data lines D. A pixel electrode PE of the liquid crystal capacitor CLC is connected to a drain electrode of the thin film transistor TFT. A common electrode CE is applied with the common voltage VCOM. The common electrode CE faces the pixel electrode PE to form an electric field in cooperation with the pixel electrode PE.

The first gate lines GV are connected with the second gate lines GH in a one-to-one correspondence.

In the above-described pixel structure, when the first gate lines GV are sequentially selected by the gate driver 140, and a gate-on voltage is applied to the selected first gate line, the thin film transistor TFT of the pixel connected to the second gate line GH electrically connected to the first gate line GV is turned on. Accordingly, voltages that include pixel information are applied to the data lines D by the source driver 130. Each such voltage is applied to the liquid crystal capacitor CLC and the storage capacitor CST through the thin film transistor of the corresponding pixel, thereby displaying a desired image.

The timing controller 120 receives image data signals and control signals from an external graphic source (not shown). The timing controller 120 generates control signals that are used to control the source driver 130 and the gate driver 140 based on the control signals received from the external graphic source. Such timing controller 120 generated control signals include, for instance, a horizontal synchronization signal, a horizontal clock signal, a vertical synchronization start signal STVP, and first to fourth clock signals.

The source driver 130 includes a source driving chip 131 and a flexible circuit board 132 on which the source driving chip 131 is mounted. The flexible circuit board 132 connects the printed circuit board 102 and the display panel 110. In the present exemplary embodiment, the source driving chip 131 is mounted on the flexible circuit board 132, but it should not be limited thereto or thereby. That is, the source driving chip 131 may be directly mounted on the display panel 110. In addition, transistors included in the source driving chip 131 may be formed through the same process used to form the thin film transistor TFT in the display area 112, and may be directly formed in the non-display area 114. The source driving chip 131 receives the image data signals, the horizontal synchronization signal, and the horizontal clock signal and generates data driving signals to drive the data lines D of the display panel 110.

The gate driver 140 outputs gate driving signals in response to the vertical synchronization start signal STVP and the first to fourth clock signals CLK1 to CLK4 provided from the timing controller 120 so as to sequentially scan the first gate lines GV in the display area 112. The term of "scanning" used herein means that the pixel connected to the first gate line to which the gate-on voltage is applied is put in a data recordable state by applying the gate-on voltage to the first gate lines. In the present exemplary embodiment, the vertical synchronization start signal STVP and the first to fourth clock signals CLK1 to CLK4 from the timing controller 120 may be applied to the gate driver 140 through first signal lines 116 and/or second signal lines 118 arranged in the non-display area 114. The first signal lines 116 are arranged on a left side of the display area 112 and the second signal lines 118 are arranged on a right side of the display area 112.

Although not shown in FIG. 1, the display apparatus 100 may further include a voltage generator that generates voltages used to drive the source driver 130 and the gate driver 140.

The gate driver 140 is arranged in an area of the non-display area 114 that is along a lower portion of the display area 112 to face the source driver 130 across the display area 112. The gate driver 140 may be configured to include an amorphous silicon gate (ASG) circuit through the same process that is applied to form the thin film transistor TFT of the display area 112.

As described above, when the gate driver 140 is arranged in the lower portion of the display area 112, a left side width DL and a right side width DR of the non-display area 114 positioned at the left and right sides of the display area 112 may be reduced. For instance, each of the left and right side widths DL and DR of the non-display area 114 is equal to or smaller than about 1 mm. When the gate driver 140 is arranged in the lower portion of the display panel 110, a narrow bezel of the display panel 110 may be achieved.

Figure 2:
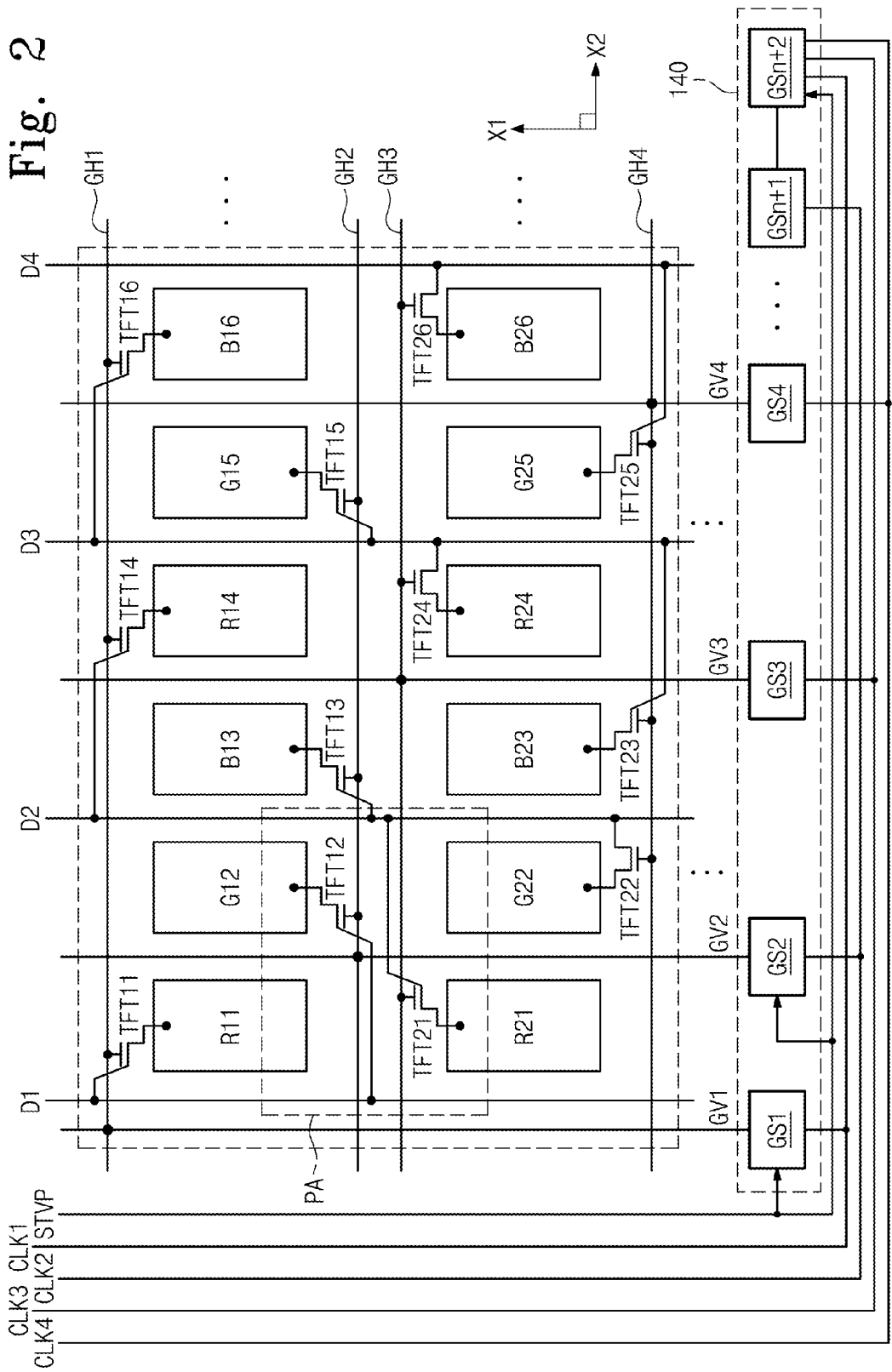
FIG. 2 is a view showing a display area of a display panel and a gate driver shown in FIG. 1.

FIG. 2 is a view showing a display area of a display panel and a gate driver shown in FIG. 1.

Referring to FIG. 2, the display area 112 includes the first gate lines GV1 to GVn, the second gate lines GH1 to GHn vertically crossing the first gate lines GV1 to GVn, the data lines D1 to Dm vertically crossing the second gate lines GH1 to GHn and are arranged substantially parallel to the first gate lines GV1 to GVn. The display area 112 also includes thin film transistors TFT11 to TFT16 and TFT21 to TFT26, and pixel electrodes R11, R14, R21, and R24, G12, G15, G22, and G25, and B13, B16, B23, and B26. In this case "R," "B," and "G," represent, for instance, red, blue, and green pixels, but may be other combinations of colors use in displays. The number of the thin film transistors TFT11 to TFT16 and TFt21 to TFT26 and the number of the pixel electrodes R11, R14, R21, and R24, G12, G15, G22, and G25, and B13, B16, B23, and B26 should not be limited to the embodiment shown in FIG. 2.

The display panel 110 includes an upper substrate (not shown) and a lower substrate (not shown). The first gate lines GV1 to GVn, the second gate lines GH1 to GHn, the data lines D1 to Dm, the thin film transistors TFT11 to TFT16 and TFT21 to TFT26, and the pixel electrodes R11, R14, R21, and R24, G12, G15, G22, and G25, and B13, B16, B23, and B26 are disposed on the lower substrate. The liquid crystal capacitor CLC shown in FIG. 1 includes as its two electrodes the corresponding pixel electrode of the pixel electrodes R11, R14, R21, and R24, G12, G15, G22, and G25, and B13, B16, B23, and B26 and the common electrode CE, and the liquid crystal layer disposed between the two electrodes serves as a dielectric substance. According to other embodiments, The common electrode CE may be disposed on the lower substrate. In this case, the pixel electrode and the common electrode have a linear or bar shape.

Although not shown in FIG. 2, the storage capacitor CST is configured to include signal lines disposed on the lower substrate and the pixel electrodes R11, R14, R21, and R24, G12, G15, G22, and G25, and B13, B16, B23, and B26 overlapped with the signal lines. The signal lines are applied with a storage voltage VST having a constant value. Red, green, and blue color filters are disposed in positions corresponding to the pixel electrodes R11, R14, R21, and R24, G12, G15, G22, and G25, and B13, B16, B23, and B26, respectively, to display colors.

In FIG. 2, the first gate lines GV1 to GVn are extended in the first direction X1 and the second gate lines GH1 to GHn are extended in the second direction X2 to cross the first gate lines GV1 to GVn. The data lines D1 to Dm cross the second gate lines GH1 to GHn and are arranged substantially parallel to the second gate lines GH1 to GHn. The first gate lines GV1 to GVn are alternately arranged with the data lines D1 to Dm, and either one of the first gate lines GV1 to GVn or one of the data lines D1 to Dm is disposed between two pixel electrodes that are adjacent to each other in the second direction X2.

The second gate lines GH1 to GHn are arranged with two second gate lines positioned between two pixel electrodes that are adjacent to each other in the first direction X1. For instance, two second gate lines GH2 and GH3 are disposed between two pixel electrodes R11 and R21, G12 and G22, B13 and B23, etc. that are adjacent to each other in the first direction X1. In other words, the second gate lines GH1 to GHn are disposed at upper and lower portions of each of the pixel electrodes R11, R14, R21, and R24, G12, G15, G22, and G25, and B13, B16, B23, and B26. First, fourth, and sixth pixel electrodes R11, R14, and B16 disposed in a first row along the second direction X2 are connected to an odd-numbered second gate line GH1 disposed at the upper portion thereof, and first, fourth, and sixth pixel electrodes R21, R24, and B26 disposed in a second row along the second direction X2 are connected to an odd-numbered second gate line GH3 disposed at the upper portion thereof. Second, third, and fifth pixel electrodes G12, B13, and G15 disposed in the first row along the second direction X2 are connected to an even-numbered second gate line GH2 disposed at the lower portion thereof, and second, third, and fifth pixel electrodes G22, B23, and G25 disposed in the second row along the second direction X2 are connected to an even-numbered second gate line GH4 disposed at the upper portion thereof.

The arrangement of the pixel electrodes shown in FIG. 2 is repeated in each row in units of six pixel electrodes along the second direction X2. Accordingly, seventh, tenth, twelfth, thirteenth, sixteenth, and eighteenth, etc. pixel electrodes arranged in each row along the second direction X2 are connected to the odd-numbered second gate line disposed at the upper portion thereof, and eighth, ninth, eleventh, fourteenth, fifteenth, and seventeenth, etc. pixel electrodes arranged in each row along the second direction X2 are connected to the even-numbered second gate line disposed at the lower portion thereof.

The configuration of the display area 112 shown in FIG. 2 is appropriate for a column inversion driving scheme, but it should not be limited to the column inversion driving scheme. That is, the configuration of the display area 112 according to the present exemplary embodiment may also be applied to, for example, a dot inversion driving scheme.

The gate driver 140 includes a plurality of gate stages GS1 to GSn respectively corresponding to the first gate lines GV1 to GVn, a first dummy stage GSn+1, and a second dummy stage GSn+2.

Each of the gate stages GS1 to GSn outputs the gate driving signal to drive the corresponding first gate line of the first gate lines GV1 to GVn. The gate stages GS1 and GS2 respectively corresponding to a first first gate line GV1 and a second first gate line GV2. The second dummy stages GSn+2 receive the vertical synchronization start signal STVP from the timing controller 120 shown in FIG. 1. The gate stages GS1 to GSn and the first and second dummy stages GSn+1 and GSn+2 are connected with each other in a cascade structure.

Figure 3:
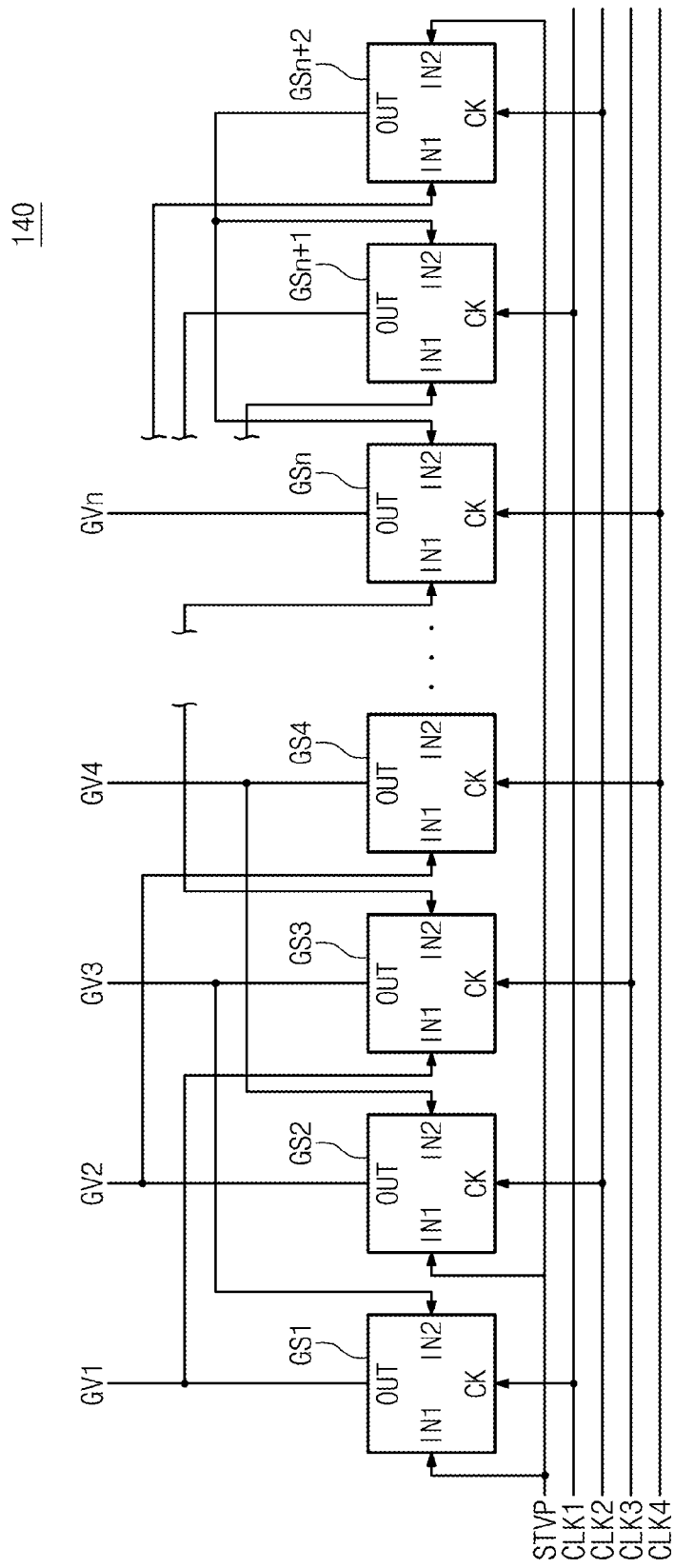
FIG. 3 is a view showing a connection relation between gate stages and first and second dummy stages shown in FIG. 2.

FIG. 3 is a view showing a connection relationship between gate stages and first and second dummy stages shown in FIG. 2.

Referring to FIG. 3, each of the gate stages GS1 to GSn and each of the first and second dummy stages GSn+1 and GSn+2 include a first input terminal IN1, a second input terminal IN2, a clock terminal CK, and an output terminal OUT. The first input terminal IN1 of the gate stages GS1 and GS2 respectively correspond to the first first gate line GV1 and the second first gate line GV2. The second input terminal IN2 of the second dummy stage GSn+2 receives the vertical synchronization start signal STVP from the timing controller 120 shown in FIG. 1. The first input terminal IN1 of each of the gate stages GSi corresponding to i-th ("i" is a natural number larger than 3 first gate lines and the first input terminal IN1 of each of the first and second dummy stages GSn+1 and GSn+2 receive the output of (i−2)th gate stages GSi−2. The second input terminal IN2 of each of the gate stages GSi corresponding to the i-th first gate lines receives the output of (i+2)th gate stages GSi+2. The second input terminal IN2 of the first dummy stage GSn+1 receives the output of the second dummy stage GSn+2 and the second input terminal IN2 of the second dummy stage GSn+2 receives the vertical synchronization start signal STVP from the timing controller 120 shown in FIG. 1. Each of the gate stages GS1 to GSn and each of the first and second dummy stages GSn+1 and GSn+2 may further receive voltages required to drive the first gate lines GV1 to GVn.

Figure 4:
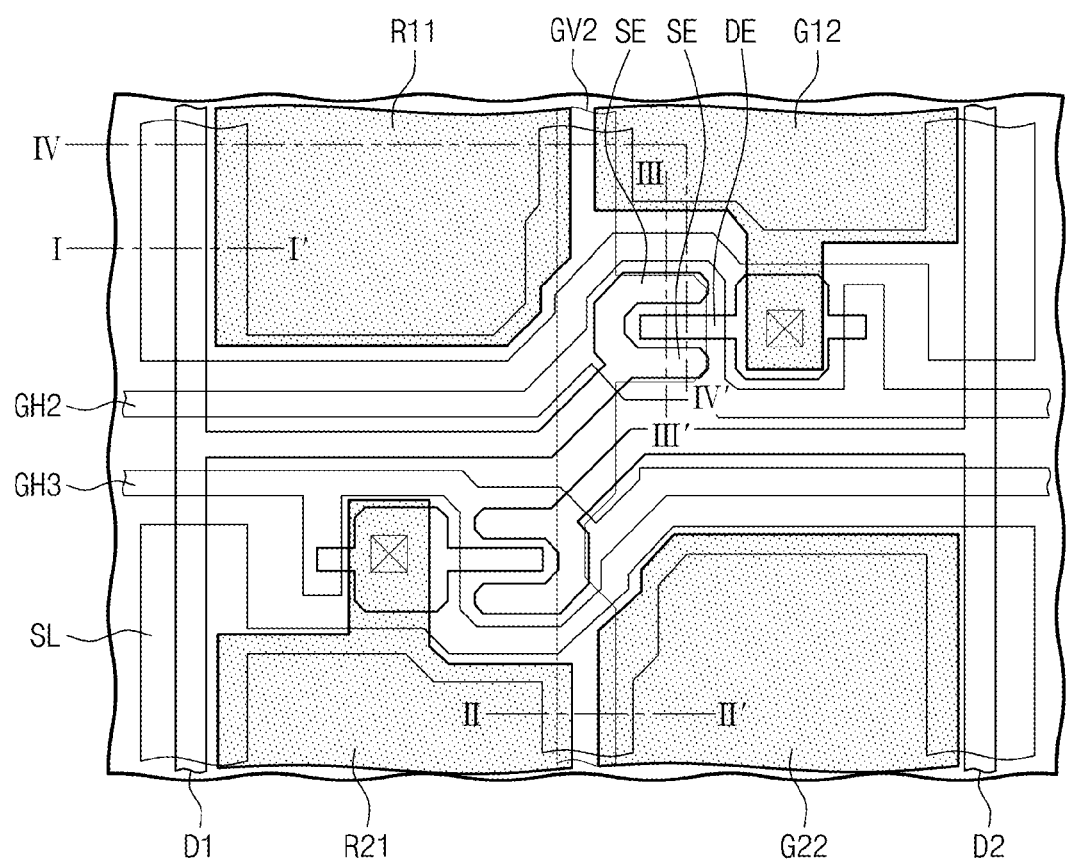
FIG. 4 is a plan view showing a portion of a display panel shown in FIG. 2.
Figure 5:
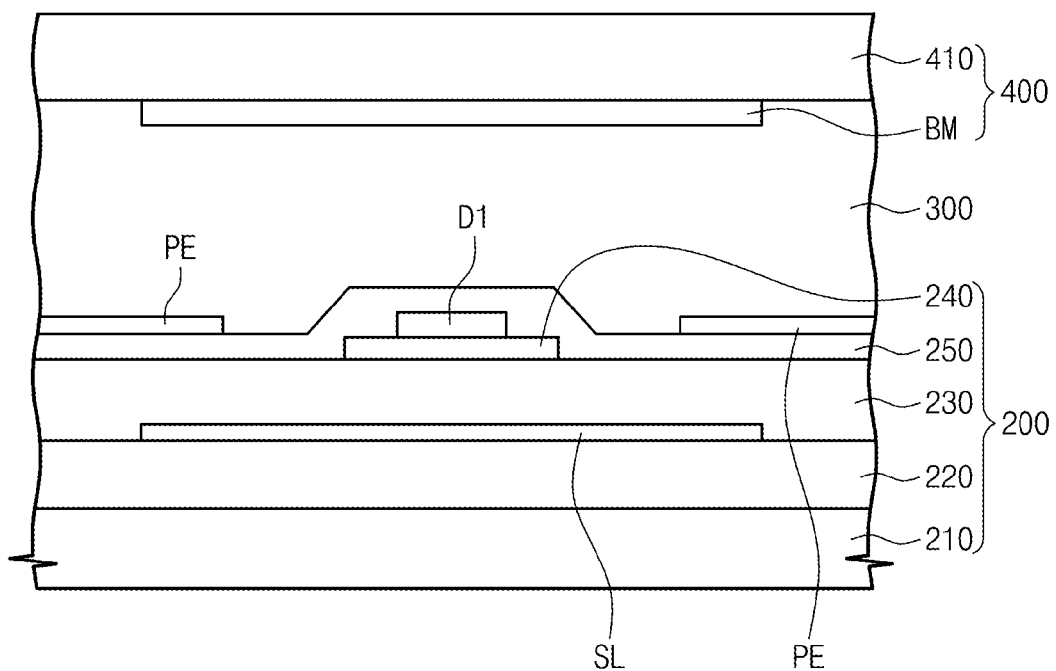
FIG. 5 is a cross-sectional view taken along a line I-I' shown in FIG. 4.
Figure 6:
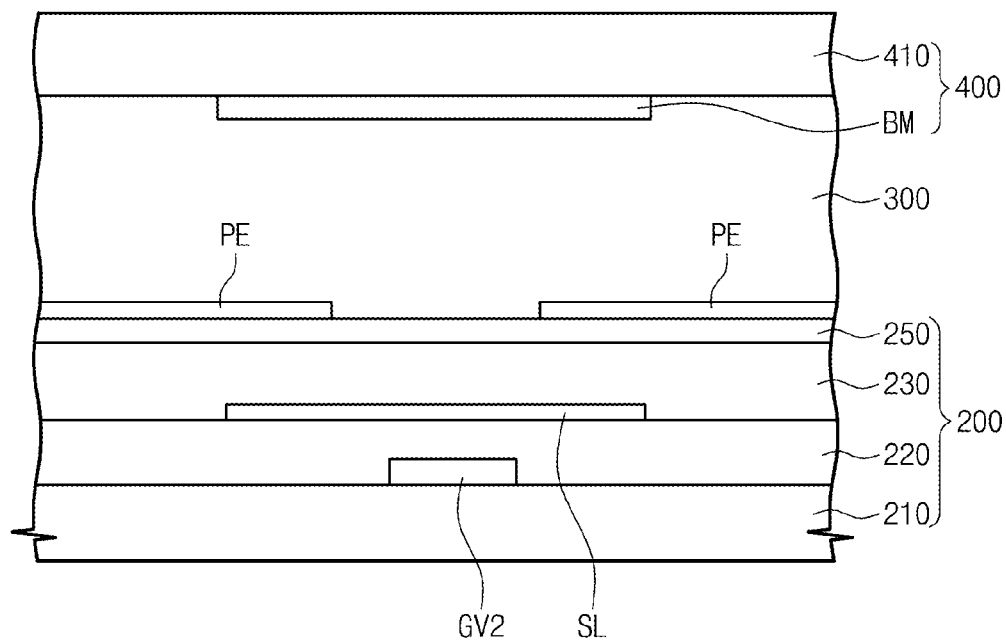
FIG. 6 is a cross-sectional view taken along a line II-II' shown in FIG. 4.
Figure 7:
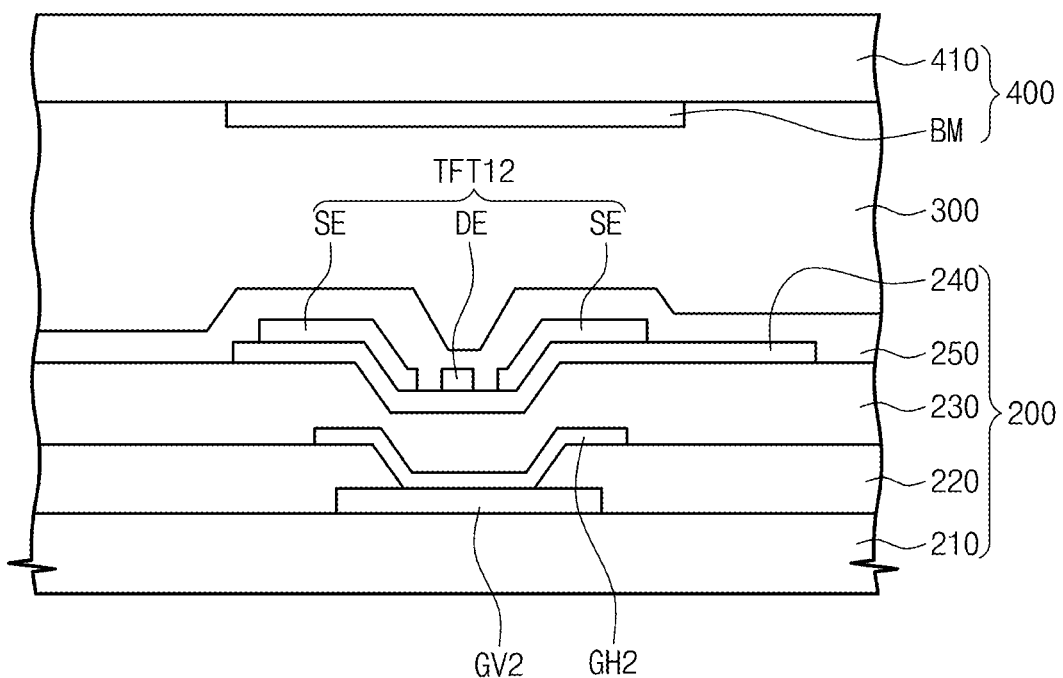
FIG. 7 is a cross-sectional view taken along a line III-III' shown in FIG. 4.

FIG. 4 is a plan view showing a portion of a display panel shown in FIG. 2, FIG. 5 is a cross-sectional view taken along a line I-I' shown in FIG. 4, FIG. 6 is a cross-sectional view taken along a line II-II' shown in FIG. 4, and FIG. 7 is a cross-sectional view taken along a line III-III' shown in FIG. 4.

Referring to FIGS. 4 to 7, the display panel 110 includes the lower substrate 200, the upper substrate 400 facing the lower substrate 200, and the liquid crystal layer 300 disposed between the lower substrate 200 and the upper substrate 400.

The lower substrate 200 includes a first base substrate 210. The first gate lines are disposed on the first base substrate 210. For the convenience of explanation, one specific first gate line GV2 disposed on the first base substrate 210 has been shown in FIGS. 4, 6 and 7 as an example. A first insulating layer 220 is disposed on the first base substrate 210 and the first gate line GV2. The first insulating layer 220 may be formed of, for example, silicon nitride (SiNx) or silicon oxide (SiOx). The first insulating layer 220 is provided with a via hole (not shown) formed therethrough to expose a portion of the first gate line GV2. The second gate lines and the storage electrode line SL are disposed on the first insulating layer 220. For the convenience of explanation, two specific second gate lines GH2 and GH3 have been shown in FIG. 4 as an example. The storage electrode line SL is connected to the storage capacitor CST shown in FIG. 1 to apply the storage voltage VST to the storage capacitor CST. The second gate line GH2 makes contact with the first gate line GV2 (FIG. 7). A second insulating layer 230 is disposed on the first base substrate 210 to cover the first gate line GV2 and the second gate line GH2. The second insulating layer 230 may include, for example, silicon nitride (SiNx) or silicon oxide (SiOx).

An active pattern 240 is disposed on the second insulating layer 230. A source electrode SE and a drain electrode DE of the thin film transistor TFT12 are disposed on the active pattern 240. After the thin film transistor TFT12 is formed on the first base substrate 210, a passivation layer 250 is disposed on the first base substrate 210 to protect the data line D1 and the thin film transistor TFT12. The pixel electrode PE is disposed on the protective layer 250 to completely fabricate the lower substrate 200. The pixel electrode PE is formed of a transparent conductive material, such as, for example, indium tin oxide or indium zinc oxide.

The upper substrate 400 includes a second base substrate 410 and the black matrix BM.

The second base substrate 410 may be, for example, a transparent glass substrate or a soda-lime glass substrate. The black matrix BM includes a material that blocks a light and is disposed on the second base substrate 410 in a position that corresponds to the data line D1, the first gate line GV2, the second gate line GH2, the thin film transistor TFT12, and the storage electrode line SL.

When the first gate line GV2, which is substantially parallel to the data line D1, is disposed on a layer different from a layer on which the data line D1 is disposed, a kick-back noise, which can be caused by the distortion of signals transmitted through the data line D1 and the first gate line GV2, may be prevented from occurring on the pixel.

FIGS. 8A, 9A, 10A and 11A are plan views showing a method of manufacturing a display apparatus shown in FIG. 1 and FIGS. 8B, 9B, 10B and 11B are cross-sectional views taken along a line IV-IV' shown in FIG. 4

In FIGS. 8A to 11A and 8B to 11B, the same reference numerals denote the same elements, and thus duplicative descriptions of the same elements will be omitted.

Figure 8A:
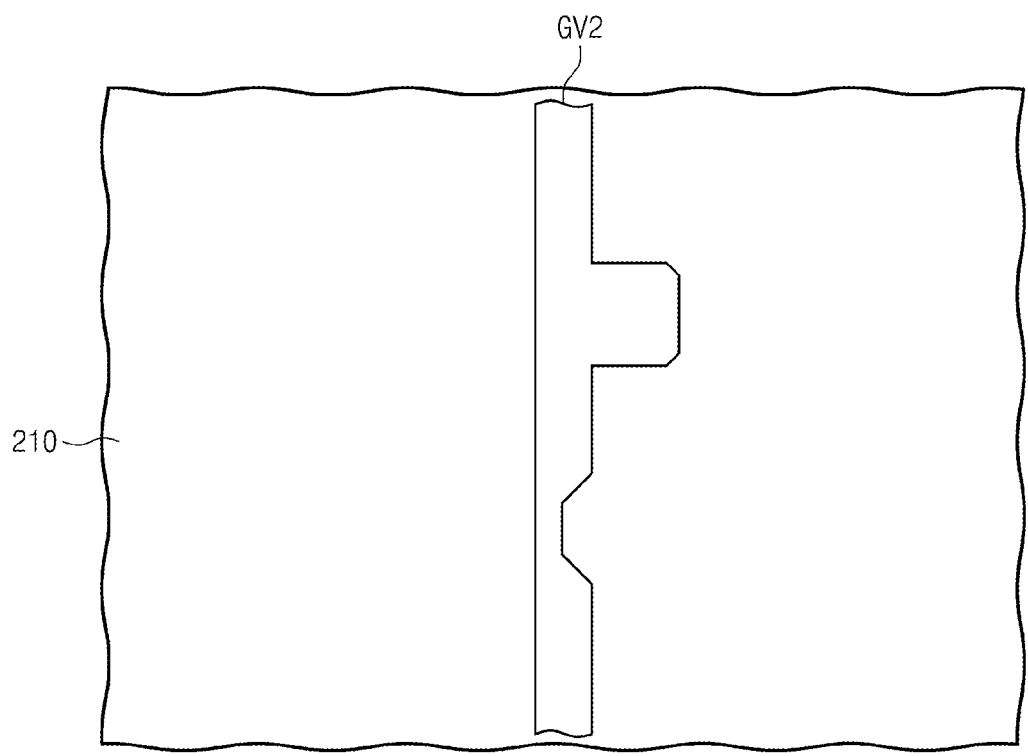
FIGS. 8A, 9A, 10A and 11A are plan views showing a method of manufacturing a display apparatus shown in FIG. 1.

Referring to FIGS. 8A and 8B, the first gate line GV2 is formed on the first base substrate 210. The first base substrate 210 may be, for example, a transparent glass substrate, a transparent insulating substrate, or a transparent plastic substrate. The first gate line GV2 may be formed to include a contact pad that makes contact with the other lines.

The first insulating layer 220 is formed on the first base substrate 210 to cover the first gate line GV2. The first insulating layer 220 may include silicon nitride (SiNx) or silicon oxide (SiOx). The first insulating layer 220 is provided with the via hole 221 to expose a portion of the first gate line GV2. The via hole 221 is formed through the first insulating layer 220. The via hole 221 is formed in a position corresponding to the position of the contact pad of the first gate line GV2. When the first gate lines GV1 to GVn correspond to and are connected with the second gate lines GH1 to GHn in a one-to-one correspondence, the number of the via holes 221 formed through the first insulating layer 220 is equal to the number of the first gate lines GV1 to GVn.

Figure 9A:
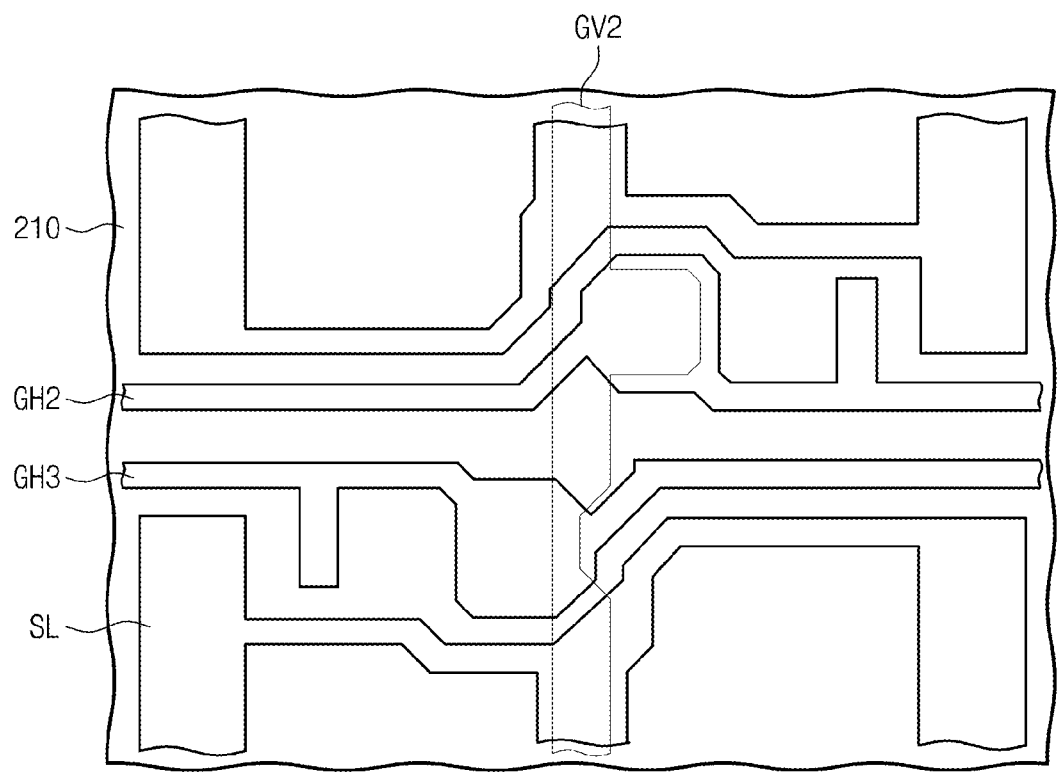

Referring to FIGS. 9A and 9B, the second gate lines GH2 and GH3 and the storage electrode line SL are formed on the first insulating layer 220. The second gate line GH2 is connected to the first gate line GV1 through the via hole 221 of the first insulating layer 220.

Figure 10A:
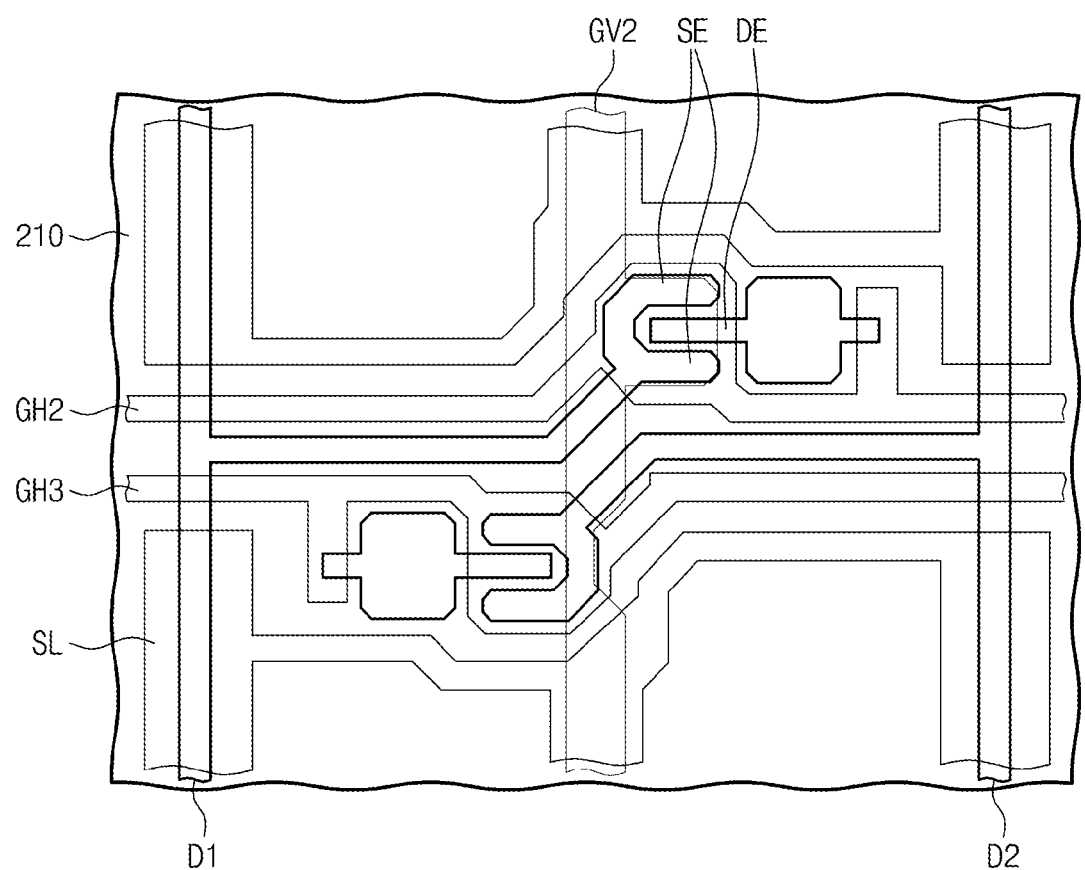

Referring to FIGS. 10A and 10B, the second insulating layer 230 is formed on the first insulating layer 220 to cover the second gate lines GH2 and GH3 and the storage electrode line SL. The active pattern 240 is formed on the second insulating layer 230, and then the source electrode SE, the drain electrode DE, and the data line D are formed. Then, the passivation layer 250 is formed on the first base substrate 210 to cover the source electrode SE, the drain electrode DE, and the data line D.

Figure 11A:
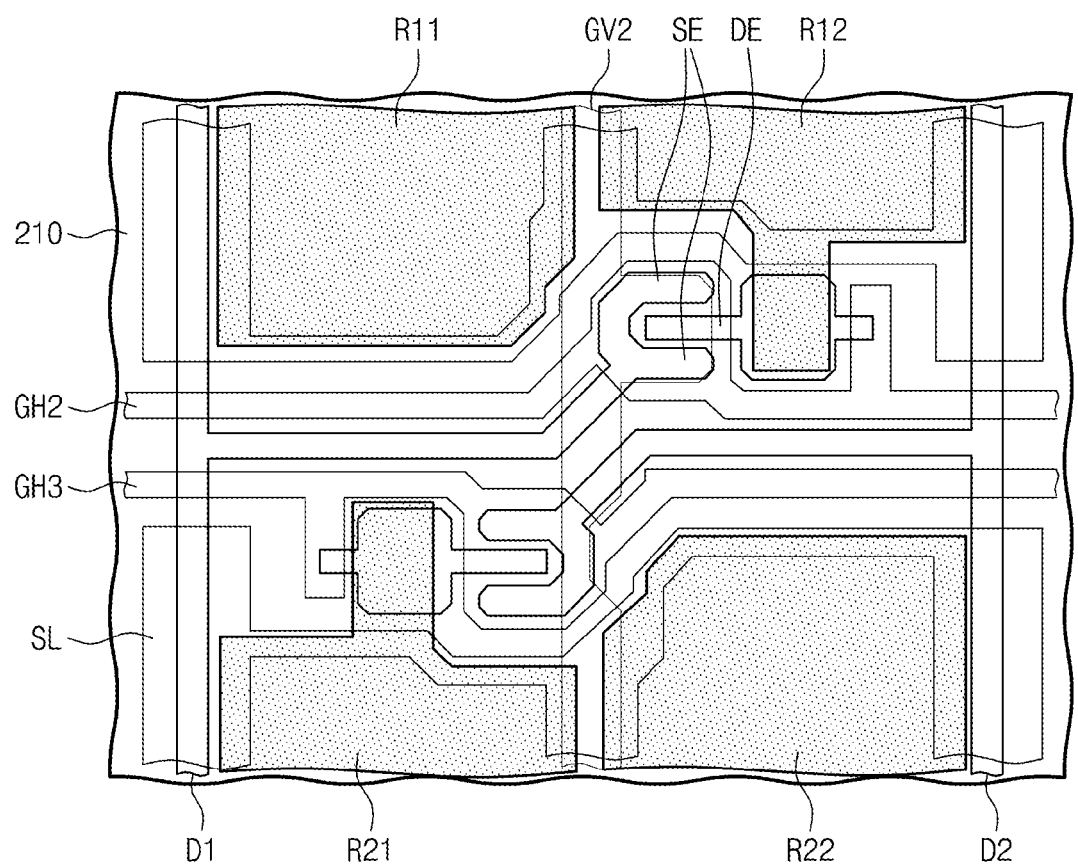
Figure 11B:
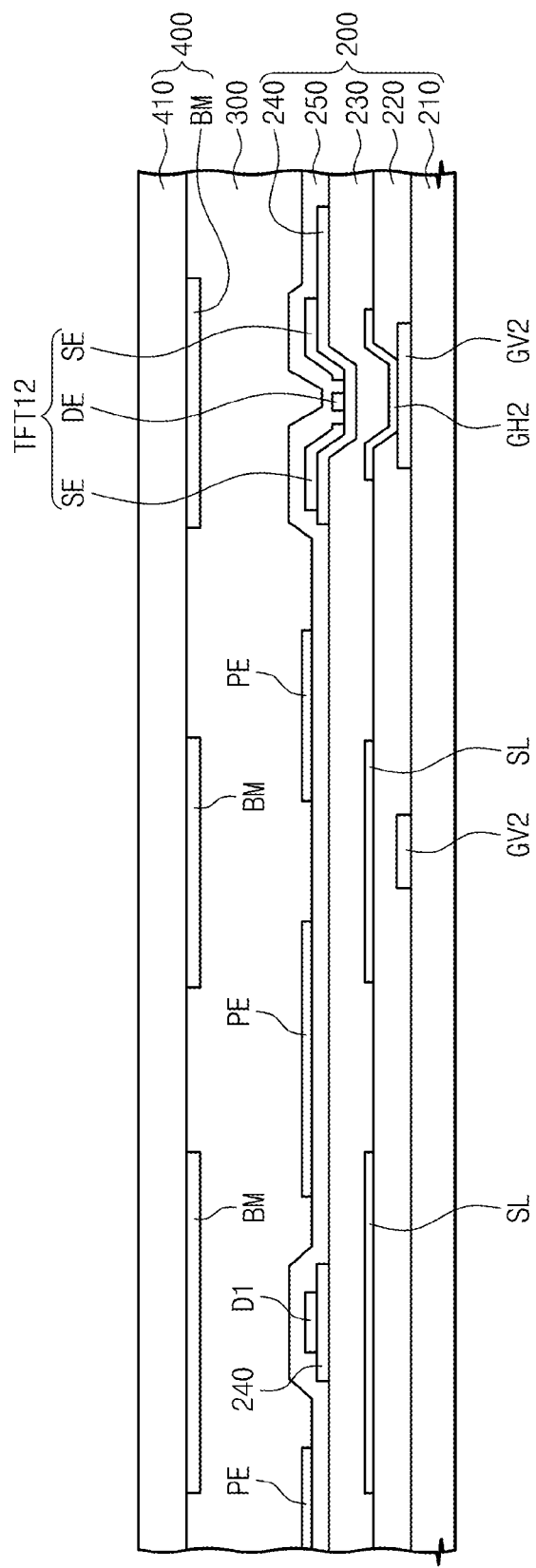

Referring to FIGS. 11A and 11B, the pixel electrode PE is formed on the passivation layer 250, thereby completing the lower substrate 200. The pixel electrode PE is connected to the drain electrode DE.

The liquid crystal layer 300 is formed on the lower substrate 200, and then the lower substrate 200 is coupled with the upper substrate 400.

The black matrix BM is formed on the upper substrate 400 in a position to correspond to the positions of the thin film transistor TFT12, the data line D1, and the first gate line GV1. In addition, the common electrode CE shown in FIG. 1 may be further formed on the upper substrate 400. The common electrode CE forms the electric field together with the pixel electrode PE to control the arrangement of liquid crystal molecules of the liquid crystal layer 300.

According to the above embodiment, the first gate lines GV1 to GVn, which are substantially parallel to the data lines D1 to Dm, are formed on a different layer from the layer on which the data lines D1 to Dm are formed. Thus, a signal interference between the signals transmitted through the first gate line GV1 to GVn and the data lines D1 to Dm may be prevented. As a result, although the gate driver 140 is positioned at the lower portion of the display panel 110, the display quality of the display apparatus 100 may be prevented from deteriorating.

Figure 12:
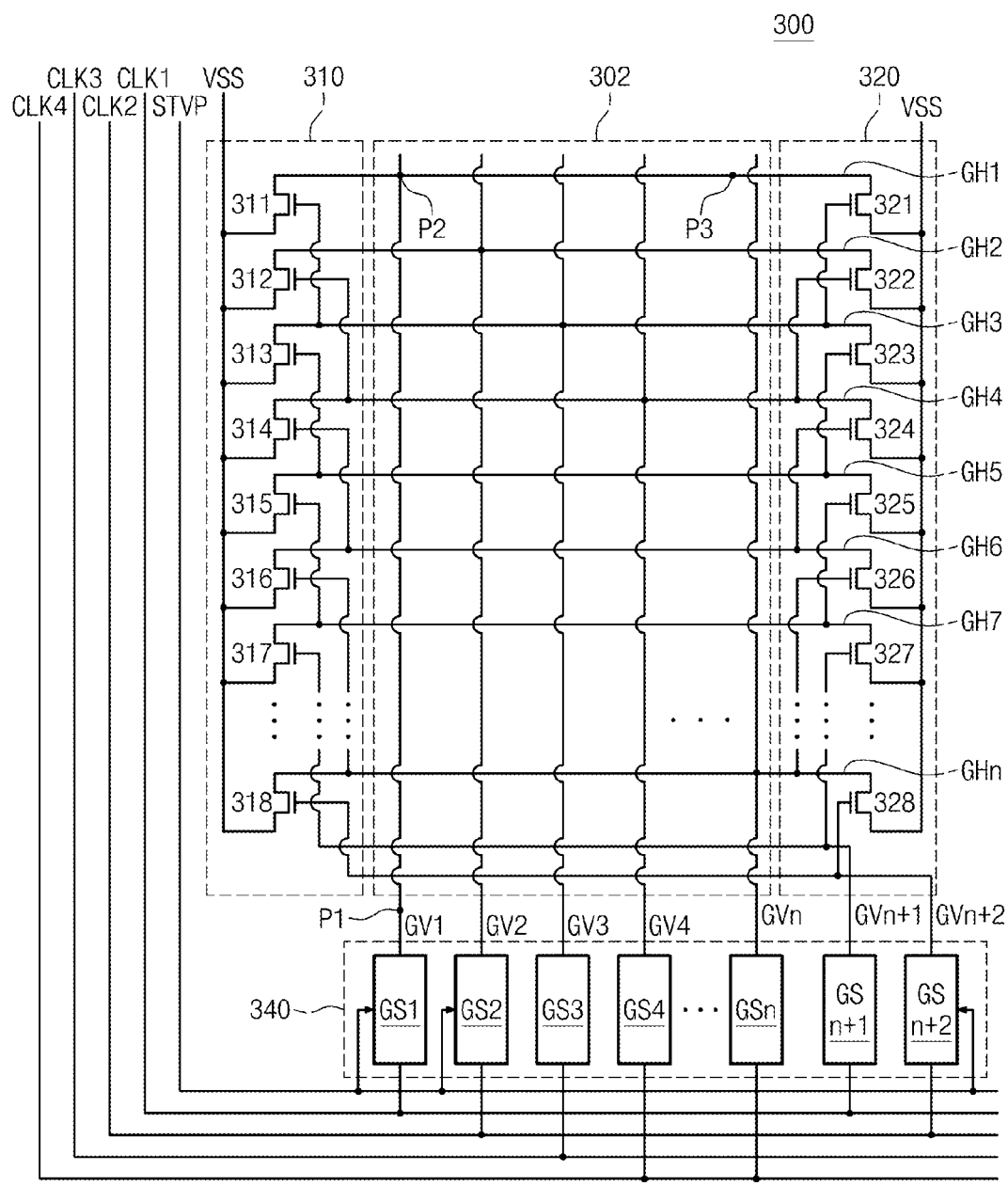
FIG. 12 is a view showing a display apparatus according to an exemplary embodiment.

FIG. 12 is a view showing a display apparatus according to an exemplary embodiment.

Referring to FIG. 12, a display apparatus 300 further includes a first discharge circuit 310 and a second discharge circuit 320. Although not shown in FIG. 12, the display apparatus 300 further includes a timing controller and a source driver. The first discharge circuit 310 is disposed adjacent to a first side of a display area 302 of the display apparatus 300, and the second discharge circuit 320 is disposed adjacent to a second side of the display area 302, which is opposite to the first side. The display area 302 has same configuration as display area 112, shown in FIG. 1.

The first discharge circuit 310 includes a plurality of first discharge transistors 311 to 318. The actual number of first discharge transistors is n, equal to the number for second gate lines GH, but specific numbers are used here for ease of description. Among the first discharge transistors 311 to 318, an i-th (i is a positive constant number) first discharge transistor is connected between an i-th second gate line GH of the second gate lines GH1 to GHn and a ground voltage VSS, and includes a gate terminal connected to an (i+2)th second gate line GHi+2 of the second gate lines GH3 to GHn. For instance, the first discharge transistor 311 is connected between the second gate line GH1 and the ground voltage VSS, and includes the gate terminal connected to the second gate line GH3. The first discharge transistor 318 (i.e., the last of the n first discharge transistors) is connected between the second gate line GHn and the ground voltage VSS, and includes the gate terminal connected to the second dummy stage GSn+2.

The second discharge circuit 320 includes a plurality of second discharge transistors 321 to 328. (Again, the actual number of second discharge transistors is n, equal to the number for second gate lines GH, but specific numbers are used here for ease of description). The second discharge transistors 321 to 328 have the circuit configuration similar to the first discharge transistors 311 to 318. That is, among the second discharge transistors 321 to 328, an i-th (i is a positive constant number) second discharge transistor is connected between an i-th second gate line GH of the second gate lines GH1 to GHn and the ground voltage VSS, and includes a gate terminal connected to the (i+2)th second gate line GHi+2 of the second gate lines GH3 to GHn. For instance, the second discharge transistor 321 is connected between the second gate line GH1 and the ground voltage VSS, and includes the gate terminal connected to the second gate line GH3. The second discharge transistor 327 (i.e., the n−1th second discharge transistor) is connected between the second gate line GH7 and the ground voltage VSS, and includes the gate terminal connected to the first dummy stage GSn+1. The second discharge transistor 328 (i.e., the nth second discharge transistor) is connected between the second gate line GHn and the ground voltage VSS, and includes the gate terminal connected to the second dummy stage GSn+2.

When the (i+1)th second gate line GHi+1 is driven, each of the i-th first discharge transistors 311 to 318 and each of the i-th second discharge transistors 321 to 328 discharge the i-th second gate line GHi to the ground voltage VSS. Accordingly, when the first gate lines GV1 to GVn are connected to the second gate lines GH1 to GHn in the above-mentioned structure, the gate signal may be prevented from being delayed due to a load difference between the gate lines.

In FIG. 12, the first and second discharge circuits 310 and 320 disposed opposite to each other while interposing the display area 302 of the display apparatus 300 therebetween have been shown, but they should not be limited thereto or thereby. That is, the display apparatus 300 may include either of the first discharge circuit 310 or the second discharge circuit 320.

Figure 13:
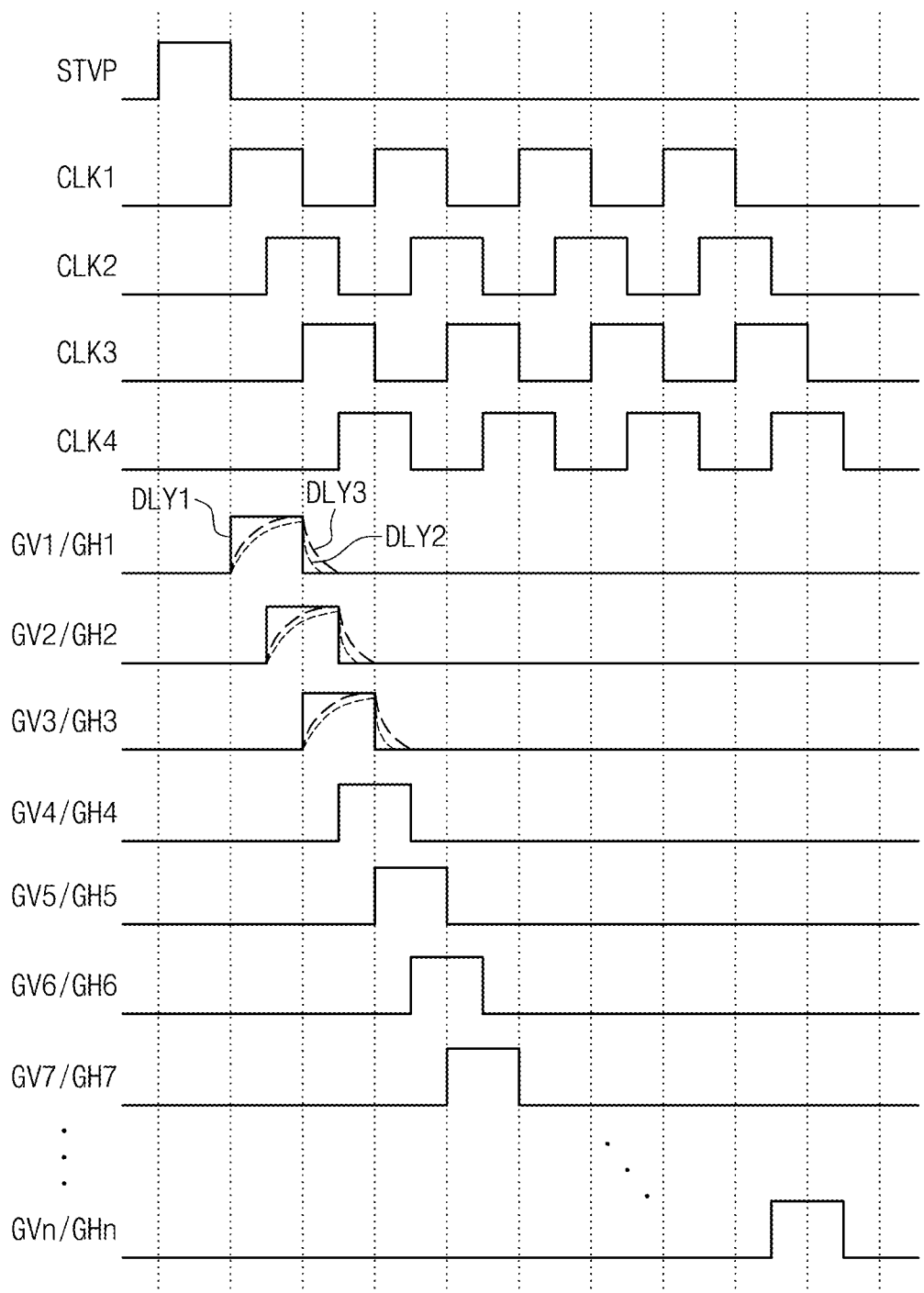
FIG. 13 is a timing diagram showing signals used in the display apparatus shown in FIG. 12.

FIG. 13 is a timing diagram showing signals used in the display apparatus shown in FIG. 12.

Referring to FIGS. 12 and 13, the gate stages GS1 to GSn and the first and second dummy stages GSn+1 and GSn+2 receive the vertical synchronization start signal STVP and the first to fourth clock signals CLK1 to CLK4 from the timing controller 120 shown in FIG. 1. The first and third clock signals CLK1 and CLK3 have the same frequency and the same duty ratio. The first and third clock signals CLK1 and CLK3 are complementary to each other and the second and fourth clock signals CLK2 and CLK4 are complementary to each other.

The gate stages GS1 to GSn and the first and second dummy stages GSn+1 and GSn+2 output signals that are used to drive the first and second gate lines GV1 to GVn and GH1 to GHn in response to the vertical synchronization start signal STVP and the first to fourth clock signals CLK1 to CLK4.

In the case that the first and second discharge circuits 310 and 320 are turned off or not employed in the display apparatus 300, the falling times of the gate driving signals at a first point P1, a second point P2 and a third point P3, as shown in FIG. 12, are different from each other. Each of the falling time of the gate driving signals DLY2 and DLY3 of the third point P3 on the second gate line GH1 is longer than that of the gate driving signal DLY1 of the first point P1 on the first gate line GV1. In the case that the first and second discharge circuits 310 and 320 are operated, each of the falling time of the gate driving signals DLY2 and DLY3 of the second point P2 and the third point P3 on the second gate line GH1 may be reduced. Thus, image spots that may be caused by the extension of the tail of the gate driving signal may be prevented when the discharge circuits 310 and 320 are operated.

FIGS. 14 to 18 are views showing display apparatuses according to exemplary embodiments.

Figure 14:
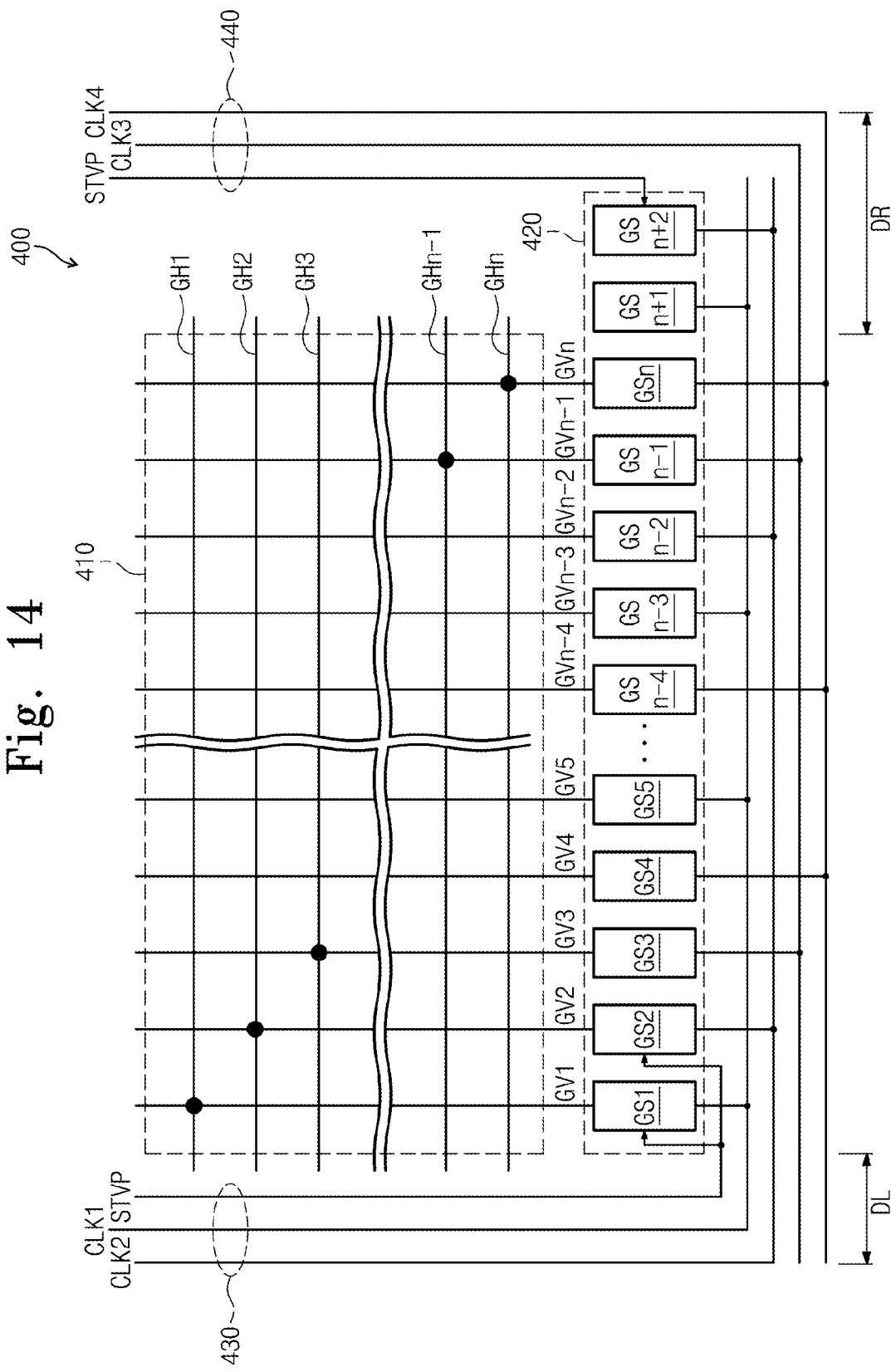
FIGS. 14 to 18 are views showing display apparatuses according to exemplary embodiments.

Referring to FIG. 14, a vertical synchronization start signal STVP and first to fourth clock signals CLK1 to CLK4 provided from the timing controller (not shown) may be applied to a gate driver 420 through first signal lines 430 disposed at a left side of a display panel 410 and second signal lines 440 disposed at a right side of the display panel 410. That is, the vertical synchronization start signal STVP and the first and second clock signals CLK1 and CLK2 are applied to the gate driver 420 through the first signal lines 430, and the vertical synchronization start signal STVP and the third and fourth clock signals CLK3 and CLK4 are applied to the gate driver 420 through the second signal lines 440. When the first to fourth clock signals CLK1 to CLK4 are applied to the gate driver 420 through the first signal lines 430 and the second signal lines 440, a width DL of a left non-display area adjacent to the display area 410 and a width DR of a right non-display area adjacent to the display area 410 may be reduced. The left and right non-display area on which the first and second signal lines 430 and 440 are disposed may be disposed on the same substrate in which the pixels are disposed FIG. 15 is a view showing a display apparatus 500 according to an exemplary embodiment.

Figure 15:
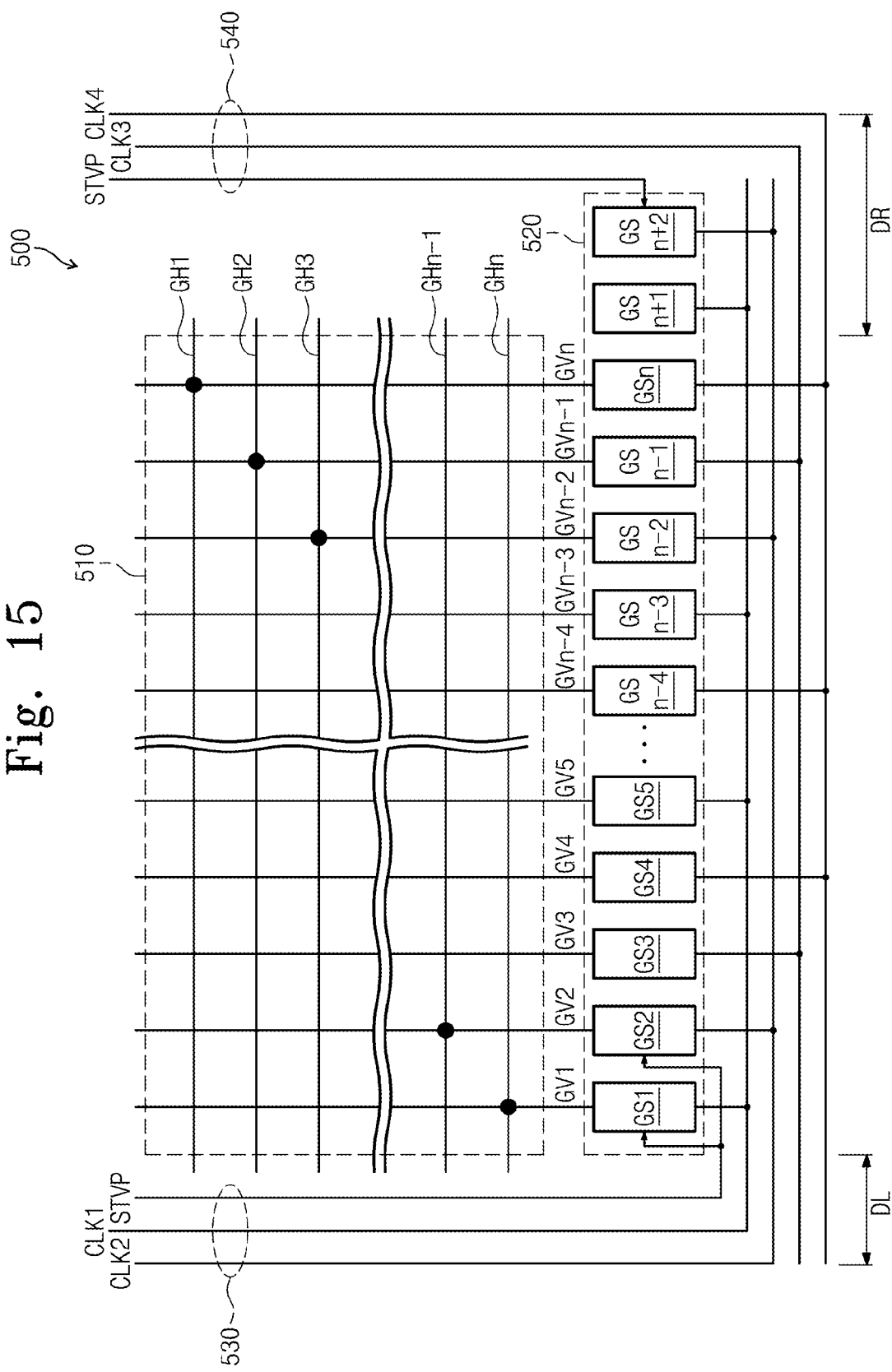

The display apparatus 500 shown in FIG. 15 has a structure that is similar to that of the display apparatus 400 shown in FIG. 14. However, according to the present exemplary embodiment, the first gate lines GV1 to GVn are connected to the second gate lines GH1 to GHn in a different order from the connection order between the first gate lines GV1 to GVn and the second gate lines GH1 to GHn employed in the display apparatus 400 shown in FIG. 14. The first gate line GV1 is connected to the second gate line GHn and the first gate line GV2 is connected to the second gate line GHn−1. In addition, the first gate line GVn−1 is connected to the second gate line GH2 and the first gate line GVn is connected to the second gate line GH1.

Similarly, because the first to fourth clock signals CLK1 to CLK4 are applied to the gate driver 520 through the first signal lines 530 and the second signal lines 540, the width DL of the left non-display area adjacent to the display area 510 and the width DR of the right non-display area adjacent to the display area 510 may be reduced.

In the present exemplary embodiment, the first gate lines GV1 to GVn are sequentially driven, and thus the second gate lines GHn to GH1 are sequentially driven.

Figure 16:
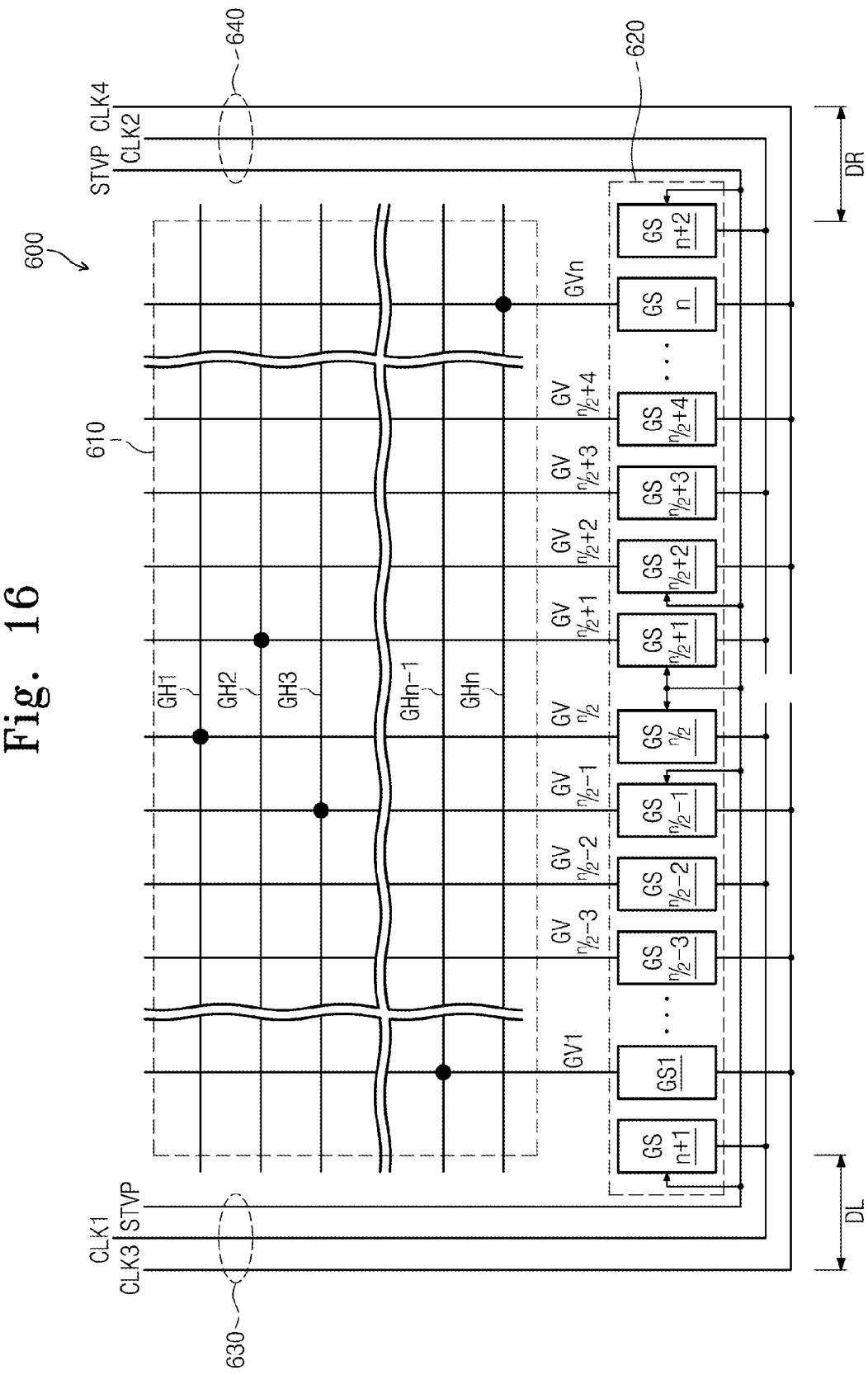

FIG. 16 is a view showing a display apparatus 600 according to an exemplary embodiment.

The display apparatus 600 shown in FIG. 16 has a structure that is similar to that of the display apparatus 400 shown in FIG. 14. However, according to the present exemplary embodiment, the first gate lines GV1 to GVn are connected to the second gate lines GH1 to GHn in the different order from the connection order between the first gate lines GV1 to GVn and the second gate lines GH1 to GHn employed in the display apparatus 400 shown in FIG. 14.

The vertical synchronization start signal STVP and the first and third clock signals CLK1 and CLK3 are applied to the gate driver 620 through the first signal lines 630, and the vertical synchronization start signal STVP and the second and fourth clock signals CLK2 and CLK4 are applied to the gate driver 620 through the second signal lines 640.

The first gate lines GV1 to GVn2 on the left side of the display area 610 are sequentially respectively connected to odd-numbered second gate lines GHn−1, GHn−3, . . . GH3, and GH1, among the second gate lines GHn−1 to GH1, which are sequentially arranged from the lower portion of the display area 610 in which the gate driver 620 is disposed. The first gate lines (GVn/2)+1 to GVn on the right side of the display area 610 are sequentially respectively connected to even-numbered second gate lines GH2, GH4, . . . , GHn−2, and GHn among the second gate lines GH2 to GHn, which are sequentially arranged from the upper portion of the display area 610 in which the source driver (not shown) is disposed.

In this case, the vertical synchronization start signal STVP is applied to the gate stages GSn/2, (GSn/2)−1, (GSn/2)+1, and (GSn/2)+2, which are respectively connected to the first gate lines GVn/2, (GVn/2)−1, (GVn/2)+1, and (GVn/2)+2 and the first and second dummy stages GSn+1 and GSn+2. The first dummy stage GSn+1 is disposed at a left side of the gate stage GS1 and the second dummy stage GSn+2 is disposed at a right side of the gate stage GSn. The gate stages GSn/2 to GS1 and the first dummy stage GSn+1 are connected to each other in the cascade structure as the gate driver 140 shown in FIG. 3. The gate stages (GSn/2)+1 to GSn and the second dummy stage GSn+2 are connected to each other in the cascade structure as the gate driver 140 shown in FIG. 3.

Therefore, the first gate lines GVn/2, (GVn/2)+1, (GVn/2)−1, (GVn/2)+2, . . . , GV1, and GVn are sequentially driven, and thus the second gate lines GH1 to GHn are sequentially driven.

Figure 17:
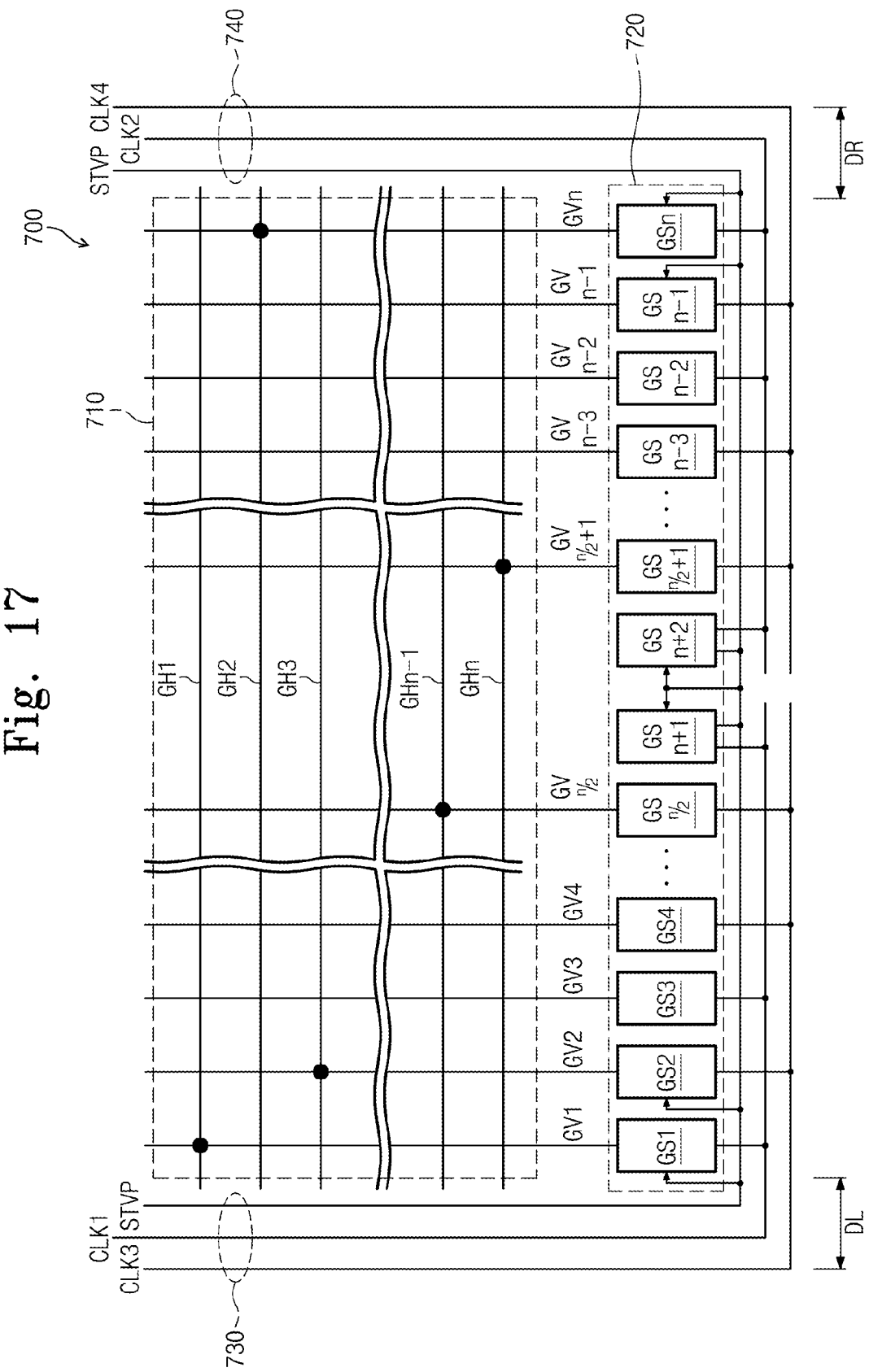

FIG. 17 is a view showing a display apparatus 700 according to an exemplary embodiment.

The display apparatus 700 shown in FIG. 17 has the structure similar to that of the display apparatus 400 shown in FIG. 14. However, according to the present exemplary embodiment, the first gate lines GV1 to GVn are connected to the second gate lines GH1 to GHn in the different order from the connection order between the first gate lines GV1 to GVn and the second gate lines GH1 to GHn employed in the display apparatus 400 shown in FIG. 14.

The first gate lines GV1 to GVn/2 are sequentially respectively connected to odd-numbered second gate lines GH1, GH3, . . . , GHn−3, and GHn−1 among the second gate lines GH1 to GHn−1. The first gate lines (GVn/2)+1 to GVn are sequentially respectively connected to even-numbered second gate lines GHn, GHn−2, . . . , GH4, and GH2 among the second gate lines GHn to GH2, which are sequentially arranged from the lower portion of the display area 710 in which the gate driver 720 is disposed.

The vertical synchronization start signal STVP and the first and third clock signals CLK1 and CLK3 are applied to the gate driver 720 through the first signal lines 730, and the vertical synchronization start signal STVP and the second and fourth clock signals CLK2 and CLK4 are applied to the gate driver 720 through the second signal lines 740.

In this case, the vertical synchronization start signal STVP is applied to the gate stages GS1, GS2, GSn−1, and GSn, which are respectively connected to the first gate lines GV1, GV2, GVn−1, and GVn, and the first and second dummy stages GSn+1 and GSn+2. The first dummy stage GSn+1 is disposed at a right side of the gate stage GSn/2 and the second dummy stage GSn+2 is disposed at a left side of the gate stage (GSn/2)+1. The gate stages GS1 to GSn/2 and the first dummy stage GSn+1 are connected to each other in the cascade structure as the gate driver 140 shown in FIG. 3. The gate stages GSn to (GSn/2)+1 and the second dummy stage GSn+2 are connected to each other in the cascade structure as the gate driver 140 shown in FIG. 3.

Therefore, the first gate lines GV1, GVn, GV2, GVn−1, . . . , GVn/2, and (GVn/2)+1 are sequentially driven, and thus the second gate lines GH1 to GHn are sequentially driven.

Figure 18:
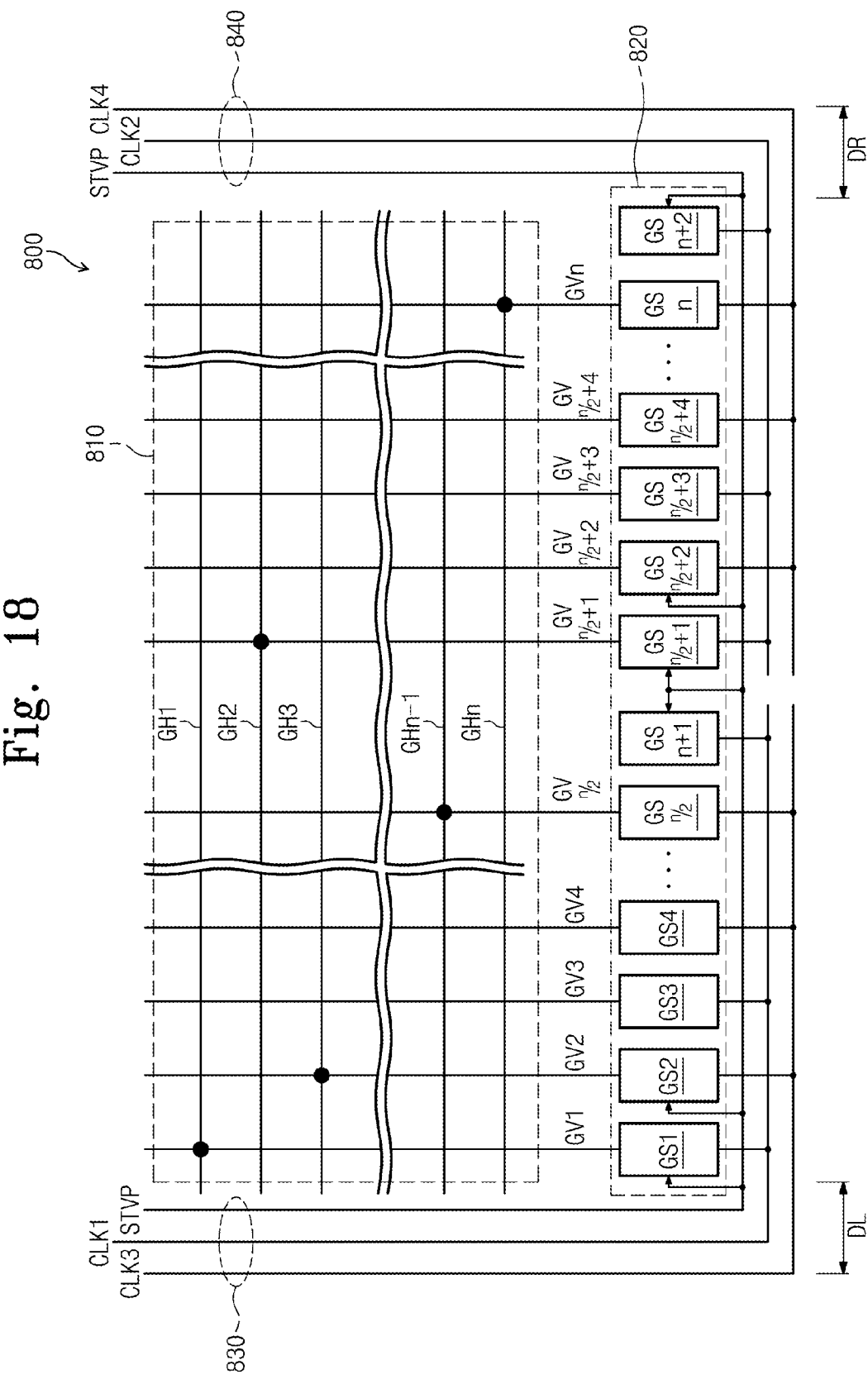

FIG. 18 is a view showing a display apparatus 800 according to an exemplary embodiment.

The display apparatus 800 shown in FIG. 18 has the structure similar to that of the display apparatus 400 shown in FIG. 14. However, according to the present exemplary embodiment, the first gate lines GV1 to GVn are connected to the second gate lines GH1 to GHn in the different order from the connection order between the first gate lines GV1 to GVn and the second gate lines GH1 to GHn employed in the display apparatus 400 shown in FIG. 14.

The first gate lines GV1 to GVn/2 are sequentially respectively connected to odd-numbered second gate lines GH1, GH3, . . . , GHn−3, and GHn−1 among the second gate lines GH1 to GHn−1. The first gate lines (GVn/2)+1 to GVn are sequentially respectively connected to even-numbered second gate lines GH2, GH4, GHn−2, . . . , and GHn among the second gate lines GH2 to GHn.

The vertical synchronization start signal STVP and the first and third clock signals CLK1 and CLK3 are applied to the gate driver 820 through the first signal lines 830, and the vertical synchronization start signal STVP and the second and fourth clock signals CLK2 and CLK4 are applied to the gate driver 820 through the second signal lines 840.

In this case, the vertical synchronization start signal STVP is applied to the gate stages GS1, GS2, (GSn/2)+1, and (GSn/2)+2, which are respectively connected to the first gate lines GV1, GV2, (GVn/2)+1, and (GVn/2)+2, and the first and second dummy stages GSn+1 and GSn+2. The first dummy stage GSn+1 is disposed at a right side of the gate stage GSn/2 and the second dummy stage GSn+2 is disposed at a right side of the gate stage GSn. The gate stages GS1 to GSn/2 and the first dummy stage GSn+1 are connected to each other in the cascade structure as the gate driver 140 shown in FIG. 3. The gate stages (GSn/2)+1 to GSn and the second dummy stage GSn+2 are connected to each other in the cascade structure as the gate driver 140 shown in FIG. 3.

Therefore, the first gate lines GV1, (GVn/2)+1, GV2, (GVn/2)+2, . . . , GVn/2, and GVn are sequentially driven, and thus the second gate lines GH1 to GHn are sequentially driven.

According to the above-mentioned embodiments, the first to fourth clock signals CLK1 to CLK4 are applied to the gate driver through the first signal lines and the second signal lines, which are respectively positioned at the left and right sides of the display panel, and thus the width DL of the left non-display area adjacent to the display area and the width DR of the right non-display area adjacent to the display area may be reduced.

Although the exemplary embodiments have been described, it is understood that the present invention should not be limited to these exemplary embodiments but various changes and modifications can be made by one ordinary skilled in the art within the spirit and scope of the present disclosure include the following claims.

What is claimed is:
1. A display apparatus comprising:
a plurality of first gate lines extended in a first direction and disposed on a substrate on which a plurality of pixels are disposed;

a plurality of second gate line extended in a second direction to cross the first gate lines;
a plurality of data lines disposed substantially parallel to the first gate lines;
a first insulating layer disposed between the first gate lines and the second gate lines and provided with a plurality of via holes each positioned to expose a portion of a corresponding first gate line of the first gate lines, wherein each of the first gate lines makes contact with a corresponding second gate line of the second gate lines through a corresponding via hole of the via holes;
a second insulating layer that covers the second gate lines;
an active pattern disposed to face a contact region in which the first gate lines are connected to the second gate lines;
source electrodes respectively branched from the data lines over the active pattern; and
drain electrodes respectively each positioned corresponding to and being spaced apart from the source electrodes.

2. The display apparatus of claim 1, wherein the first gate lines are disposed on the substrate, and the first insulating layer is disposed on the substrate to cover the first gate lines and provided with the via holes each of which exposes the portion of the corresponding first gate line of the first gate lines.

3. The display apparatus of claim 1, wherein the first gate lines are alternately arranged with the data lines and either one of the first gate lines or one of the data lines is disposed between two pixels adjacent to each other in the second direction among the pixels.

4. The display apparatus of claim 3, further comprising:
a source driver connected to a first end of each of the data lines; and
a gate driver disposed adjacent to a second end of each of the data lines and connected to a first end of each of the first gate lines.

5. The display apparatus of claim 4, wherein each of the number of the first gate lines and the number of the second gate lines is n (where n is (2×a) and a is a positive constant), and the first gate lines are connected to the second gate lines in a one-to-one correspondence through the via holes.

6. The display apparatus of claim 4, further comprising:
a first discharge circuit disposed at a first side of the substrate and connected to the second gate lines to discharge an i-th second gate line when a predetermined time lapses after the i-th second gate line is driven, where the i is a natural number satisfying 1≤i≤n; and
a second discharge circuit disposed at a second side of the substrate to face the first discharge circuit and connected to the second gate lines to discharge the i-th second gate line when the predetermined time lapses after the i-th second gate line is driven.

7. The display apparatus of claim 6, wherein the first discharge circuit comprises a plurality of first discharge transistors each respectively corresponding to the second gate lines, and an i-th first discharge transistor is connected between the i-th second gate line and a ground voltage and includes a gate terminal controlled by a signal from an (i+2)th second gate line.

8. The display apparatus of claim 7, wherein the second discharge circuit comprises a plurality of second discharge transistors each respectively corresponding to the second gate lines, and an i-th second discharge transistor is connected between the i-th second gate line and the ground voltage and includes a gate terminal controlled by the signal from the (i+2)th second gate line.

9. The display apparatus of claim 4, wherein the gate driver comprises:
a plurality of gate stages respectively corresponding to the first gate lines to drive a corresponding first gate line of the first gate lines in response to a corresponding one of first, second, third, and fourth clock signals;
a first dummy stage operated in response to the first clock signal; and
a second dummy stage operated in response to the second clock signal, the gate stages, each of which corresponds to a first first-gate line and a second first-gate line among the gate stages, and the second dummy stage receive a vertical synchronization signal, even-numbered stages among the gate stages and first and second dummy stages are connected to each other in a cascade structure, and odd-numbered stages among the gate stages and first and second dummy stages are connected to each other in a cascade structure.

10. The display apparatus of claim 9, further comprising:
first signal lines that transmit the first and third clock signals and the vertical synchronization start signal; and
second signal lines that transmit the second and fourth clock signals, wherein the first signal lines are connected to the gate stages and the first and second dummy stages through a first area adjacent to a display area on which the pixels are disposed and the second signal lines are connected to the gate stages and the first and second dummy stages through a second area adjacent to the display area and opposite to the first area.

11. The display apparatus of claim 10, wherein first to n-th first gate lines of the first gate lines are sequentially connected to first to n-th second gate lines of the second gate lines, the first second gate line is disposed most adjacent to the source driver, and the first to n-th second gate lines are sequentially arranged.

12. The display apparatus of claim 9, further comprising:
first signal lines that transmit the first and third clock signals and the vertical synchronization start signal; and
second signal lines that transmit the second and fourth clock signals and the vertical synchronization start signal, wherein the first signal lines are connected to the gate stages and the first and second dummy stages through a first area of the substrate and the second signal lines are connected to the gate stages and the first and second dummy stages through a second area of the substrate and opposite to the first area.

13. The display apparatus of claim 12, wherein first to n-th first gate lines of the first gate lines are sequentially connected to first to n-th second gate lines of the second gate lines, the first second gate line is disposed most adjacent to the source driver, and the first to n-th second gate lines are sequentially arranged.

14. The display apparatus of claim 13, wherein the gate stages respectively connected to the first and second first-gate lines of the first gate lines receive the vertical synchronization start signal through the first signal lines, and the second dummy stage receives the vertical synchronization start signal through the second signal lines.

15. The display apparatus of claim 14, wherein the first to n-th first gate lines of the first gate lines are sequentially connected to the n-th to first second gate lines of the second gate lines, the n-th second gate line is disposed most adjacent to the gate driver, and the n-th to first second gate lines are sequentially arranged.

16. The display apparatus of claim 12, wherein the first to (n/2)th first gate lines of the first gate lines are sequentially connected to odd-numbered second gate lines of the second gate lines, the first first-gate line is connected to (n−1)th second gate line, and ((n/2)+1)th to n-th first gate lines of the first gate lines are sequentially connected to even-numbered second gate lines of the second gate lines, the ((n/2)+1)th first gate line is connected to the second second-gate line, and the second second-gate line is disposed most adjacent to the source driver.

17. The display apparatus of claim 16, wherein the gate stages respectively connected to the (n/2)th first gate line and ((n/2)−1)th first gate line of the first gate lines and the first dummy stage receive the vertical synchronization start signal through the first signal lines, and the gate stages respectively connected to the ((n/2)+1)th first gate line and ((n/2)+2)th first gate line of the first gate lines and the second dummy stage receive the vertical synchronization start signal through the second signal lines.

18. The display apparatus of claim 12, wherein the first to (n/2)th first gate lines of the first gate lines are sequentially connected to odd-numbered second gate lines of the second gate lines, the first first-gate line is connected to first second-gate line that is most adjacent to the source driver, ((n/2)+1)th to n-th first gate lines of the first gate lines are sequentially connected to even-numbered second gate lines of the second gate lines, and the ((n/2)+1)th first gate line is connected to the n-th second gate line that is disposed most adjacent to the gate driver.

19. The display apparatus of claim 18, wherein the gate stages respectively connected to the first first-gate line and the second first-gate line of the first gate lines and the first dummy stage receive the vertical synchronization start signal through the first signal lines, and the gate stages respectively connected to the n-th first gate line and (n−1)th first gate line of the first gate lines and the second dummy stage receive the vertical synchronization start signal through the second signal lines.

20. The display apparatus of claim 12, wherein the first to (n/2)th first gate lines of the first gate lines are sequentially connected to odd-numbered second gate lines of the second gate lines, the first first-gate line is connected to the first second-gate line that is most adjacent to the source driver, ((n/2)+1)th to n-th first gate lines of the first gate lines are sequentially connected to even-numbered second gate lines of the second gate lines, and the ((n/2)+1)th first gate line is connected to the second second-gate line that is disposed most adjacent to the source driver.

21. A method of manufacturing a display apparatus, comprising:
   forming a first gate line on a substrate;
   forming a first insulating layer on the substrate to include a via hole through which a portion of the first gate line is exposed;
   forming a second gate line on the first insulating layer to make contact with the first gate line through the via hole;
   forming a second insulating layer to cover the second gate line;
   forming an active pattern to face a contact area in which the first gate line makes contact with the second gate line;
   forming a source electrode branched from a data line; and
   forming a drain electrode spaced apart from the source electrode.

22. The method of claim 21, wherein the first gate line is extended in a first direction on the substrate, and the second gate line is extended in a second direction on the substrate to cross the first gate line.

23. A display apparatus comprising:
   a plurality of first gate lines extended in a first direction;
   a plurality of second gate line extended in a second direction to cross the first direction and connected to the first gate lines, respectively;
   a plurality of data lines disposed substantially parallel to the first gate lines;
   a plurality of pixels respectively disposed in areas defined by the first gate lines, the second gate lines, and the data lines;
   a gate driver configured to sequentially drive the first gate lines and the second gate lines; and
   a discharge circuit connected to the second gate lines to sequentially discharge the second gate lines after the second gate lines are sequentially driven, wherein the discharge circuit includes:
      a first discharge circuit disposed at a first side of a display area in which the pixels are arranged and connected to the second gate lines to sequentially discharge the second gate lines after the second gate lines are sequentially driven; and
      a second discharge circuit disposed at a second side of a display area to face the first discharge circuit and connected to the second gate lines to sequentially discharge the second gate lines after the second gate lines are sequentially driven.

* * * * *